(12) United States Patent
Nishizaki et al.

(10) Patent No.: US 9,866,621 B2
(45) Date of Patent: *Jan. 9, 2018

(54) TRANSFER DEVICE, CLIENT APPARATUS, SERVER APPARATUS, REPRODUCTION APPARATUS AND TRANSFER METHOD

(71) Applicant: SONY CORPORATION, Tokyo (JP)

(72) Inventors: Masatoshi Nishizaki, Tokyo (JP); Masato Hattori, Kanagawa (JP); Shin Hasegawa, Tokyo (JP); Kazuhide Adachi, Tokyo (JP); Hirofumi Tamori, Tokyo (JP); Shin Yanai, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/991,552

(22) Filed: Jan. 8, 2016

(65) Prior Publication Data

US 2016/0119407 A1   Apr. 28, 2016

Related U.S. Application Data

(63) Continuation of application No. 13/315,618, filed on Dec. 9, 2011, now Pat. No. 9,246,981.

(30) Foreign Application Priority Data

Dec. 21, 2010 (JP) .............................. P2010-284539

(51) Int. Cl.
 *G06F 15/16* (2006.01)
 *H04L 29/08* (2006.01)
 (Continued)

(52) U.S. Cl.
 CPC ........ *H04L 67/06* (2013.01); *G06F 17/30899* (2013.01); *H04L 29/06* (2013.01);
 (Continued)

(58) Field of Classification Search
 CPC .......................... H04L 29/08072; H04L 29/06
 (Continued)

(56) References Cited

U.S. PATENT DOCUMENTS 5,987,510 A * 11/1999 Lmai ................ G06F 17/30106
                                                   707/E17.01
2003/0187852 A1   10/2003 Abe et al.
 (Continued)

FOREIGN PATENT DOCUMENTS

JP           2007-42253          2/2007

*Primary Examiner* — Chris Parry
*Assistant Examiner* — Weiwei Stiltner
(74) *Attorney, Agent, or Firm* — Paratus Law Group, PLLC

(57) ABSTRACT

A technology is disclosed by which, when plural content data are successively transmitted from a server apparatus to a reproduction apparatus through a client apparatus, if the transmission is interrupted, the transmission of the content data can be resumed from the point at which the transmission is interrupted. The transfer device includes a storage section for storing a transmission object list including content identification information corresponding to plural content data to be transmitted from a server apparatus to a reproduction apparatus connected to a client apparatus through the client apparatus. A reception section successively receives the content data from the server apparatus. A transmission section successively transfers the successively received content data to the reproduction apparatus. A control section deletes, every time content data is transferred, the corresponding content identification information from the transmission object list stored in the storage section.

11 Claims, 31 Drawing Sheets

(51) Int. Cl.
   *H04L 29/06*   (2006.01)
   *G06F 17/30*   (2006.01)
   *H04L 29/14*   (2006.01)
(52) U.S. Cl.
   CPC ........ *H04L 29/08072* (2013.01); *H04L 67/28* (2013.01); *H04L 67/42* (2013.01); *H04L 69/40* (2013.01)
(58) Field of Classification Search
   USPC .................... 709/230–237, 202–206, 219
   See application file for complete search history.

(56) References Cited

U.S. PATENT DOCUMENTS

| | | |
|---|---|---|
| 2006/0221964 A1 | 10/2006 | Kato |
| 2007/0012163 A1 | 1/2007 | Ijichi |
| 2008/0032739 A1 | 2/2008 | Hoodbhoy et al. |
| 2009/0061850 A1 | 3/2009 | Li et al. |
| 2010/0100444 A1* | 4/2010 | Ball ................ G06Q 30/02 705/14.55 |
| 2010/0192192 A1 | 7/2010 | Thomas et al. |
| 2010/0274849 A1 | 10/2010 | Sighart et al. |
| 2011/0004924 A1 | 1/2011 | Farrell et al. |
| 2011/0029664 A1 | 2/2011 | Harrang et al. |
| 2011/0225270 A1 | 9/2011 | Taniguchi et al. |
| 2011/0255590 A1* | 10/2011 | Kim ................ H04N 1/00347 375/240.01 |
| 2012/0011176 A1 | 1/2012 | Aizman |
| 2012/0023147 A1 | 1/2012 | Kim et al. |

\* cited by examiner

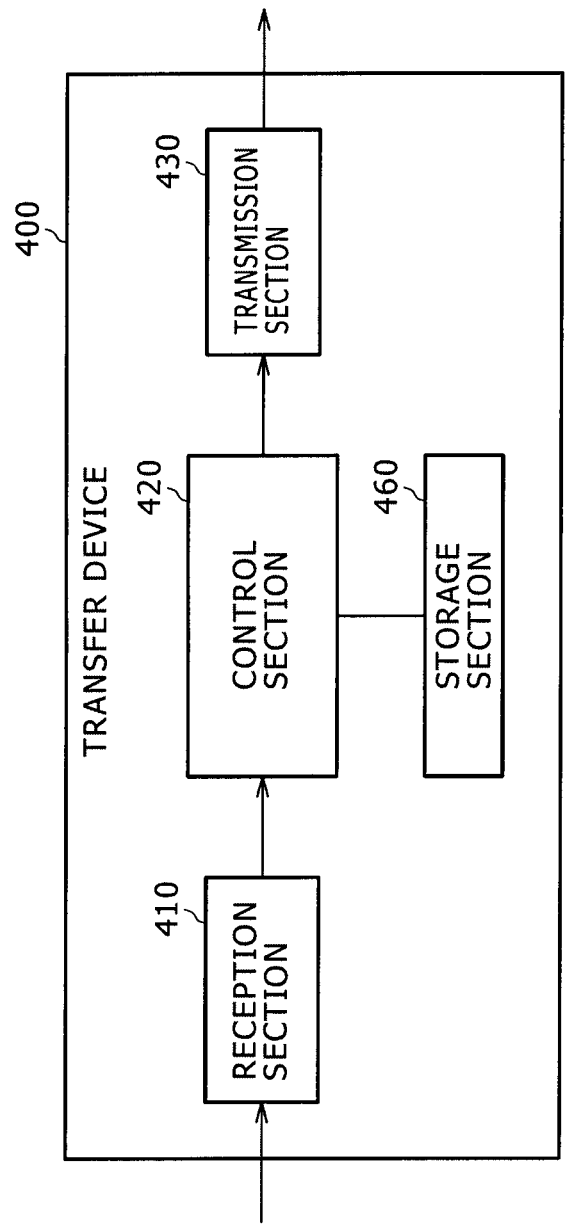

FIG.18

SyncList
{
"TrackGUIDs" : ["I10"],
"PlayListGUIDs" : ["P1", "P10", "P100", "P500"],
"ChannelGUIDs" : ["H5", "H30", "H80", "H600"],
"AllSync" : true
}

TtackGUDs :CONTENT IDENTIFICATION INFORMATION
PlayListGUIDs :PLAYLIST IDENTIFICATION INFORMATION
ChannelGUIDs :CHANNEL IDENTIFICATION INFORMATION AllSync : MyLibraryALLSYNC: SYNCHRONISM SETTING
(TRUE/FALSE) FOR ALL CONTENT DATA IDENTIFIED
WITH INFORMATION SET IN MYLIBRARY
(INDIVIDUAL USER REGISTRATION INFORMATION)

FIG.19

TargetList
{
"TrackGUIDs" : ["I10", "I30", "I250", "I400", "I461"],  ⎫
"PlayListGUIDs" : ["P1", "P10", "P100", "P500"],          ⎬ CONTENT IDENTIFICATION INFORMATION DEVELOPED BASED ON PLAYLIST
"ChannelGUIDs" : ["H5", "H30", "H80", "H600"],            ⎭
}

TtackGUIDs :CONTENT IDENTIFICATION INFORMATION
PlayListGUIDs :PLAYLIST IDENTIFICATION INFORMATION
ChannelGUIDs :CHANNEL IDENTIFICATION INFORMATION

FIG.20

CurrentList
{
"TrackGUIDs" : ["I80", "I190", "I274", "I330"],
"PlayListGUIDs" : ["P9", "P83"],
"ChannelGUIDs" : ["H85", "H153"],
}

TtackGUIDs :CONTENT IDENTIFICATION INFORMATION
PlayListGUIDs :PLAYLIST IDENTIFICATION INFORMATION
ChannelGUIDs :CHANNEL IDENTIFICATION INFORMATION

TRANSFER DEVICE, CLIENT APPARATUS, SERVER APPARATUS, REPRODUCTION APPARATUS AND TRANSFER METHOD

CROSS REFERENCE TO PRIOR APPLICATION

This application is a continuation of U.S. patent application Ser. No. 13/315,618 (filed on Dec. 9, 2011), which claims priority to Japanese Patent Application No. 2010-284539 (filed on Dec. 21, 2010), which are all hereby incorporated by reference in their entirety.

BACKGROUND

The technology disclosed herein relates to a transfer device, a client apparatus, a server apparatus, a reproduction apparatus and a transfer method.

In recent years, a client server system wherein a role which a computer is to play is shared by a client apparatus and a server apparatus is utilized in various scenes. In the client server system, generally a user browses a screen image of the client apparatus and inputs a desired instruction to the client apparatus. Then, the client apparatus transmits a request corresponding to the instruction inputted thereto from the user to the server apparatus. The server apparatus receives the request transmitted from the client apparatus, executes an operation in accordance with the request and sends back a result obtained by the execution as a response to the request to the client apparatus.

Various kinds of information can be transferred between the client apparatus and the server apparatus. For example, a client server system is generally known wherein, if a transmission request for content data is transmitted from the client apparatus to the server apparatus, then content data retained by the server apparatus is transmitted as a response to the transmission request to the client apparatus.

Further, a reproduction apparatus which can reproduce content data has been popularized. In the case where the reproduction apparatus can be connected to the client apparatus, as content data of a reproduction object by the reproduction apparatus, for example, content data which are first transmitted from the server apparatus and received by the client apparatus and then transferred from the client apparatus and received by and retained into the reproduction apparatus can be used.

In such an instance, there is the possibility that, for example, part of a plurality of content data which can be transmitted from the server apparatus may already be retained in the reproduction apparatus. Usually, content data retained already in the reproduction apparatus need not be downloaded from the server apparatus to the reproduction apparatus through the client apparatus again. Therefore, if a function which can distinguish content data retained already in the reproduction apparatus and content data which are not retained in the reproduction apparatus as yet is provided, then the convenience to the user is enhanced. Various techniques for providing such a function as just described have been proposed already, and one of such techniques is disclosed, for example, in Japanese Patent Laid-Open No. 2007-42253.

SUMMARY

However, for example, the technique disclosed in the document mentioned above has a problem in that, when a plurality of content data are successively transmitted from the server apparatus to the reproduction apparatus through the client apparatus, if the transmission is interrupted, then it is difficult to resume the transmission of the plural content data from the point at which the transmission is interrupted.

Therefore, it is desirable to provide a novel and improved technology by which, when a plurality of content data are successively transmitted from a server apparatus to a reproduction apparatus through a client apparatus, even if the transmission is interrupted, the transmission of the plural content data can be resumed from the point at which the transmission is interrupted.

Therefore, according to an embodiment of the technology disclosed herein, there is provided a transfer device including a storage section adapted to store a transmission object list including content identification information of plural contents individually corresponding to plural content data to be transmitted from a server apparatus to a reproduction apparatus connected to a client apparatus through the client apparatus, a reception section adapted to successively receive the plural content data from the server apparatus, a transmission section adapted to successively transfer the plural content data successively received by the reception section to the reproduction apparatus, and a control section adapted to delete, every time content data is transferred to the reproduction apparatus by the transmission section, the content identification information corresponding to the content data transferred by the transmission section from the transmission object list stored in the storage section.

The transfer device may be configured such that the control section acquires the content identification information of the plural contents from the transmission object list stored in the storage section and produces a content transmission request including the acquired content identification information; the transmission section transmits the content transmission request produced by the control section to the server apparatus; and the reception section successively receives the plural content data as a response to the content transmission request from the server apparatus.

In this instance, the transfer device may be configured such that the reception section can receive, after transfer of the plural content data to the reproduction apparatus is interrupted, a resumption request to resume the transfer of the plural content data to the reproduction apparatus; the control section acquires, when the resumption request is received by the reception section, content identification information of one or plural contents included in the transmission object list after the content identification is deleted and then produces a content transmission request including the acquired content identification information of the one or the plural contents; the transmission section transmits the content transmission request produced by the control section to the server apparatus; the reception section successively receives one or plural content data individually corresponding to the content identification information of the one or the plural contents included in the transmission object list after the content identification information is deleted by the control section as a response to the content transmission request from the server apparatus; and the transmission section successively transfers the one or plural content data successively received by the reception section to the reproduction apparatus.

In this instance, the transfer device may be configured such that the control section acquires, when the resumption request is received by the reception section, content identification information of one or plural contents included in the transmission object list after the content identification information is deleted and produces a content transmission request including the content identification information of the one or plural contents.

Or, the transfer device may be configured such that the control section causes the transmission object list after the content identification is deleted to be retained into the reproduction apparatus, acquires, when the resumption request is received by the reception section, content identification information of one or plural contents included in the transmission object list after the content identification information is deleted from the reproduction apparatus, and then produces a content transmission request including the acquired content identification information of the one or plural contents.

Or else, the transfer device may be configured such that the control section causes the transmission object list after the content identification is deleted to be retained into the server apparatus, acquires, when the resumption request is received by the reception section, content identification information of one or plural contents included in the transmission object list after the content identification information is deleted from the server apparatus, and then produces a content transmission request including the acquired content identification information of the one or plural contents.

The transfer device may be configured such that the reception section can receive a starting request indicating that transfer of the plural content data to the reproduction apparatus is to be started; the control section acquires, when the starting request is received by the reception section, a transmission completion list including content identification information of one or plural contents individually corresponding to one or plural content data retained in the reproduction apparatus, detects the content identification information which is included in the transmission completion list but is not included in the transmission object list, and causes content data identified based on the detected content identification information to be deleted from the reproduction apparatus; and the transmission section transmits the content transmission request to the server apparatus after the content data is caused to be deleted from the reproduction apparatus by the control section.

The transfer device may be configured such that the reception section receives the transmission object list edited by the server apparatus from the server apparatus; and the storage section stores the transmission object list received by the reception section.

In this instance, the transfer device may be configured such that the reception section can receive a transmission object list which is being edited by the server apparatus from the server apparatus; and the transmission section transmits, when the transmission object list which is being edited is received by the reception section, the transmission object list, which is being edited, received by the reception section to the reproduction apparatus.

Or, the transfer device may be configured such that the control section acquires, when playlist identification information for identifying a playlist in which content identification information of plural contents individually corresponding to plural content data is arranged in a reproduction order is included in the transmission object list received by the reception section, the content identification information of the plural contents which configures the playlist identified based on the playlist identification information, and further places the acquired content identification information of the plural contents into the content transmission request.

The transfer device may be incorporated in one of the server apparatus, client apparatus and reproduction apparatus.

According to another embodiment of the disclosed technology, there is provided a client apparatus including a storage section adapted to store a transmission object list including content identification information of plural contents individually corresponding to plural content data to be transmitted from a server apparatus to a reproduction apparatus connected to the client apparatus through the client apparatus, a reception section adapted to successively receive the plural content data from the server apparatus, a transmission section adapted to successively transfer the plural content data successively received by the reception section to the reproduction apparatus, and a control section adapted to delete, every time content data is transferred to the reproduction apparatus by the transmission section, the content identification information corresponding to the content data transferred by the transmission section from the transmission object list stored in the storage section.

According to a further embodiment of the disclosed technology, there is provided a server apparatus including a storage section adapted to store a transmission object list including content identification information of plural contents individually corresponding to plural content data to be transmitted from the server apparatus to a reproduction apparatus connected to a client apparatus through the client apparatus, a reception section adapted to successively receive the plural content data from the server apparatus, a transmission section adapted to successively transfer the plural content data successively received by the reception section to the reproduction apparatus, and a control section adapted to delete, every time content data is transferred to the reproduction apparatus by the transmission section, the content identification information corresponding to the content data transferred by the transmission section from the transmission object list stored in the storage section.

According to a still further embodiment of the disclosed technology, there is provided a reproduction apparatus including a storage section adapted to store a transmission object list including content identification information of plural contents individually corresponding to plural content data to be transmitted from a server apparatus to the reproduction apparatus connected to a client apparatus through the client apparatus, a reception section adapted to successively receive the plural content data from the server apparatus, a transmission section adapted to successively transfer the plural content data successively received by the reception section to the reproduction apparatus, and a control section adapted to delete, every time content data is transferred to the reproduction apparatus by the transmission section, the content identification information corresponding to the content data transferred by the transmission section from the transmission object list stored in the storage section.

According to a yet further embodiment of the disclosed technology, there is provided a transfer method including storing a transmission object list including content identification information of plural contents individually corresponding to plural content data to be transmitted from a server apparatus to a reproduction apparatus connected to a client apparatus through the client apparatus, successively receiving the plural content data from the server apparatus, successively transferring the successively received plural content data to the reproduction apparatus, and deleting, every time content data is transferred to the reproduction apparatus, the content identification information corresponding to the transferred content data from the stored transmission object list.

With the disclosed technology, when plural content data are successively transmitted from the server apparatus to the reproduction apparatus through the client apparatus, even if the transmission is interrupted, the transmission of the plural content data can thereafter be resumed from the point at which the transmission is interrupted.

The above and other features and advantages of the technology disclosed herein will become apparent from the following description and the appended claims, taken in conjunction with the accompanying drawings in which like parts or elements denoted by like reference characters.

BRIEF DESCRIPTION OF THE DRAWINGS

FIG. 17 is a block diagram showing a functional configuration of the transfer device;

FIG. 18 is a view illustrating an example of a transmission object list used by the transfer device;

FIG. 19 is a similar view but illustrating an example of a target list used by the transfer device;

FIG. 20 is a similar view but illustrating an example of a transmission completion list used by the transfer device;

DETAILED DESCRIPTION OF THE PREFERRED EMBODIMENT

In the following, a preferred embodiment of the disclosed technology is described in detail with reference to the accompanying drawings.

It is to be noted that the description is given in the following order.

1. Embodiment
1-1. Configuration of the Information Processing System
1-2. Process by a Different Client Apparatus of Using Content Data
1-3. Example of Various Kinds of Information Retained in the First Client Apparatus
1-4. Process by the First Client Apparatus of Registering Content Identification Information
1-5. Process by the First Client Apparatus of Registering a Playlist
1-6. Process by the Second Client Apparatus of Using Content Data
1-7. Functional Configuration of the First Client Apparatus
1-8. Functional Configuration of the Server Apparatus
1-9. Functional Configuration of the Second Client Apparatus
1-10. Services Provided by the Individual Apparatus
1-11. Example of Various Kinds of Information Retained by the Server Apparatus
1-12. Example of Display of Information Relating to Content Data 1-13. Example of a Screen Image Displayed before Start of Content Data Transfer 1-14. Example of a Display Screen Displayed during Content Data Transfer 1-15. Example of a Display Screen Displayed upon Interruption of Content Data Transfer 1-16. Functional Configuration of the Reproduction Apparatus 1-17. Functional Configuration of the Transfer device 1-18. Example of a Transmission Object List 1-19. Example of a Target List 1-20. Example of a Transmission Completion List 1-21. Process Executed upon Connection of the Transfer device 1-22. Process Executed upon Editing of a Transmission Object List 1-23. Process Executed upon Reception of a Starting Request (Part 1)

1-24. Process Executed upon Reception of a Starting Request (Part 2)

1-25. Process Executed upon Execution of Transfer 1-26. Process Executed upon Completion of Transfer 1-27. Process Executed upon Re-Starting of Transfer (Part 1)

1-28. Process Executed upon Re-Starting of Transfer (Part 2)

Figure 1:
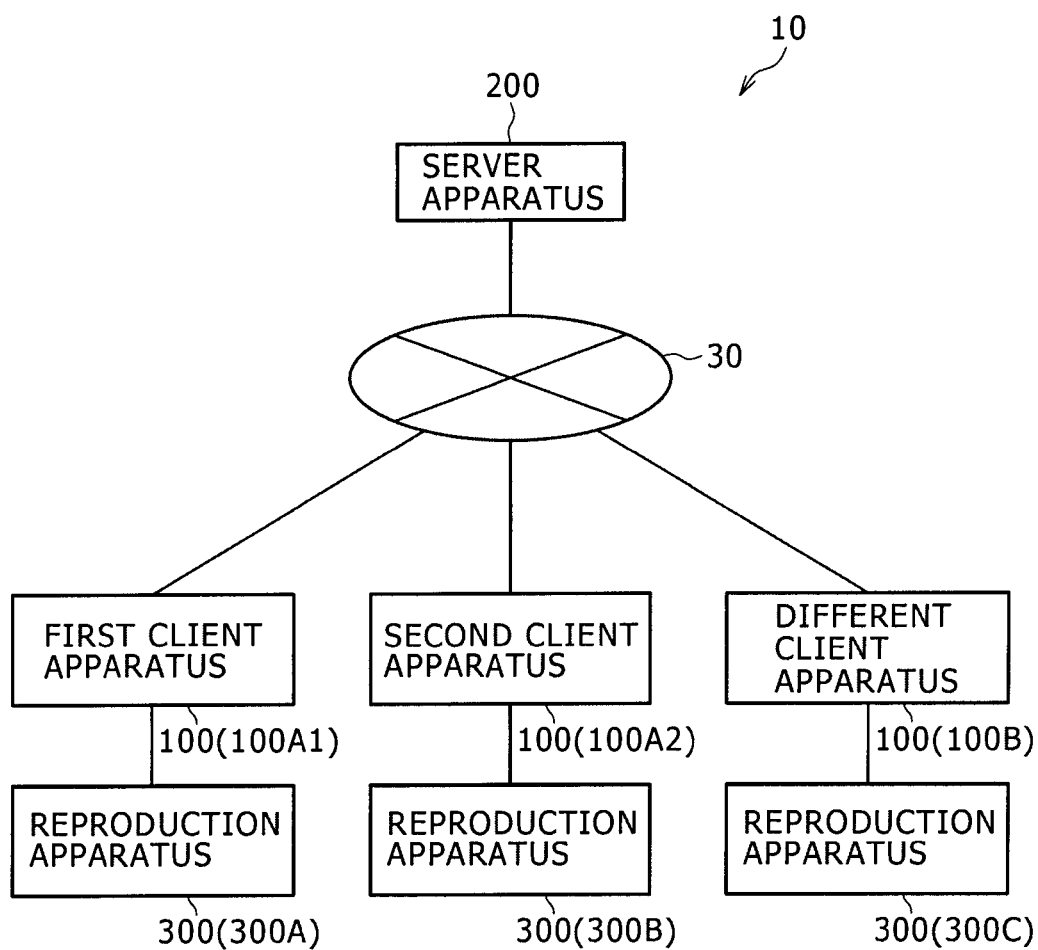
FIG. 1 is a block diagram showing a configuration of an information processing system according to a preferred embodiment of the disclosed technology.

1-29. Example of the Hardware Configuration of the Server Apparatus 1-30. Example of the Hardware Configuration of the Client Apparatus 1-31. Example of the Hardware Configuration of the Reproduction Apparatus 2. Modification 3. Summary 1. Embodiment 1-1. Configuration of the Information Processing System FIG. 1 shows a configuration of an information processing system according to a preferred embodiment of the disclosed technology. The information processing system according to the embodiment is described below with reference to FIG. 1.

The information processing system 10 of the present embodiment includes at least a first client apparatus 100A1 as an example of a client apparatus 100, and a server apparatus 200. The first client apparatus 100A1 and the server apparatus 200 are connected for communication through a network 30. The information processing system 10 of the present embodiment may include a second client apparatus 100A2 as another example of the client apparatus 100. The second client apparatus 100A2 as the example of the client apparatus 100 is connected to the server apparatus 200 for communication through the network 30.

The first client apparatus 100A1 and the second client apparatus 100A2 are used by the same user (hereinafter referred to as "user A"). It is to be noted here that, while it is described that the client apparatus 100 used by the user A are two apparatus including the first client apparatus 100A1 and the second client apparatus 100A2, the number of client apparatus 100 used by the user A is not limited to two.

Further, it is assumed that, in the embodiment of the disclosed technology, the information processing system 10 includes a different client apparatus 100B as an example of the client apparatus 100. The different client apparatus 100B is used by a user other than the user A and hereinafter referred to as "user B," and the different client apparatus 100B and the server apparatus 200 can communicate with each other similarly through the network 30. However, the information processing system 10 may otherwise be configured without including the different client apparatus 100B.

Generally, the user A carries out an operation for uploading content data used by the first client apparatus 100A1 from the first client apparatus 100A1 to the server apparatus 200 before the content data is used by the second client apparatus 100A2. Accordingly, labor and time are generally required for the user A to carry out the operation. In the description of the present embodiment, a technique by which the time and labor for uploading content data, which can be used by the first client apparatus 100A1, from the first client apparatus 100A1 to the server apparatus 200 in order to allow the content data to be used by the second client apparatus 100A2 can be reduced is described in detail. Functions which the apparatus have in order to implement the technique just described are hereinafter described principally with reference to FIGS. 1 to 9. However, the functions are not essentially required.

Further, in the present embodiment, the information processing system 10 includes a reproduction apparatus 300. The reproduction apparatus 300 is connected to a client apparatus 100 such that it can communicate with the client apparatus 100. In the example shown in FIG. 1, each of the first client apparatus 100A1, second client apparatus 100A2 and different client apparatus 100B are connected to the reproduction apparatus 300. However, only it is necessary for at least one of the first client apparatus 100A1, second client apparatus 100A2 and different client apparatus 100B to be capable of being connected to the reproduction apparatus 300.

In the description of the present embodiment, also a technique by which, when a plurality of content data are successively transmitted from the server apparatus 200 to the reproduction apparatus 300 through a client apparatus 100, even if the transmission is interrupted, the transmission of the content data can be resumed from the point at which the transmission is interrupted will be described in detail.

1-2. Process by a Different Client Apparatus of Using Content Data

Figure 2:
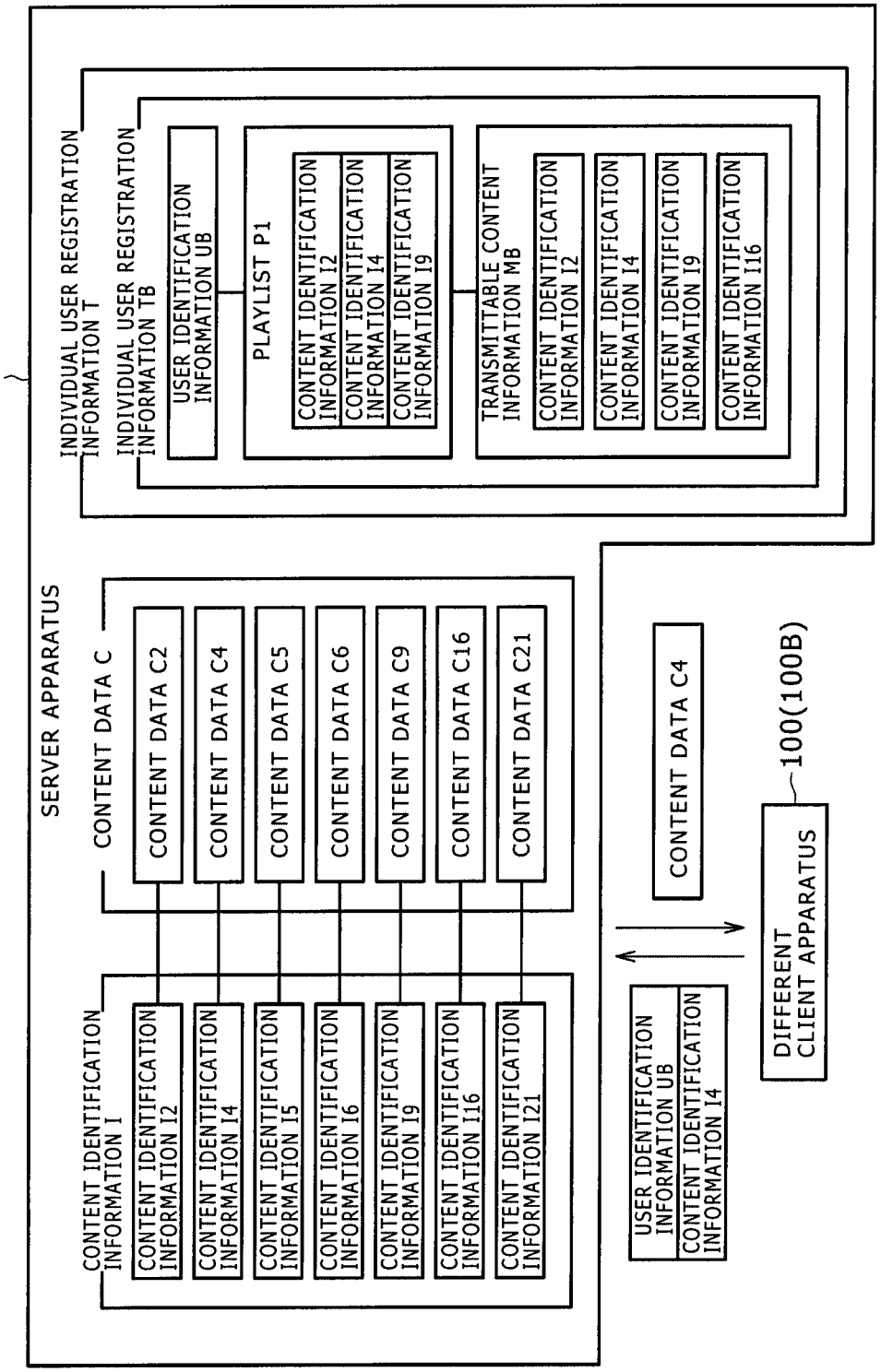
FIG. 2 is a diagrammatic view illustrating a flow of processing when content data retained in a server apparatus shown in FIG. 1 is used by a different client apparatus shown in FIG. 1.

FIG. 2 illustrates a flow of processing when content data retained by the server apparatus 200 in the present embodiment is used by the different client apparatus 100B. The flow of processing which content data used by the server apparatus 200 is used by the different client apparatus 100B is described with reference to FIG. 2.

The server apparatus 200 according to the present embodiment has stored therein content data C and content identification information I for identifying the content data C. The content identification information I may be any information if the content data C can be identified based thereon. For example, the content identification information I may be an ID allocated uniquely to the content data C or the title, the name of a performer, a genre and so forth of the content data C.

Further, the server apparatus 200 can store individual user registration information T which is registration information for each user. In the example illustrated in FIG. 2, as the individual user registration information T, individual user registration information TB which is registration information of the user B who uses the different client apparatus 100B is registered in advance in the server apparatus 200.

The individual user registration information TB is information which associates at least user identification information UB and transmittable content information MB with each other. The user identification information UB may be any information if it is for the identification of the user B.

For example, the user identification information UB may be an ID allocated uniquely to the user B, the name of the user B or the like. The transmittable content information MB is information for the identification of content data C which can be transmitted from the server apparatus 200 to the different client apparatus 100B. The individual user registration information TB may additionally include a playlist P1 associated with the user identification information UB. The playlist P1 is information representative of content identification information I of a plurality of contents arranged in the order of reproduction.

It is assumed here that, for example, the different client apparatus 100B transmits a content transmission request including user identification information UB and content identification information I4 by a predetermined operation by the user B who uses the different client apparatus 100B. When the server apparatus 200 receives the content transmission request from the different client apparatus 100B, it refers to the transmittable content information MB registered in association with the user identification information UB included in the content transmission request. Then, the server apparatus 200 decides whether or not the content identification information I4 included in the content transmission request is registered in the transmittable content information MB.

If the content identification information I4 is registered in the transmittable content information MB of the individual user registration information TB as seen in FIG. 2, then the server apparatus 200 transmits, as a response to the content transmission request, content data C4 identified based on the content identification information I4 to the different client apparatus 100B. However, if the content identification information I4 is not registered in the transmittable content information MB of the individual user registration information TB, then the server apparatus 200 can inhibit in principle the content data C4 identified with the content identification information I4 from being transmitted to the different client apparatus 100B as a response to the content transmission request.

It is assumed that, as described hereinabove with reference to FIG. 2, the individual user registration information TB regarding the user B is registered in advance and the content identification information I4 is registered as the transmittable content information MB of the individual user registration information TB. In this instance, after the different client apparatus 100B transmits a content transmission request including the user identification information UB and the content identification information I4 to the server apparatus 200, it can receive the content data C4 identified based on the content identification information I4.

On the other hand, it is assumed that the content identification information I4 is not registered as the transmittable content information MB of the individual user registration information TB. In this instance, if a content transmission request including the user identification information UB and the content identification information I4 is transmitted to the server apparatus 200, then the different client apparatus 100B cannot receive the content data C4 identified based on the content identification information I4.

Figure 3:
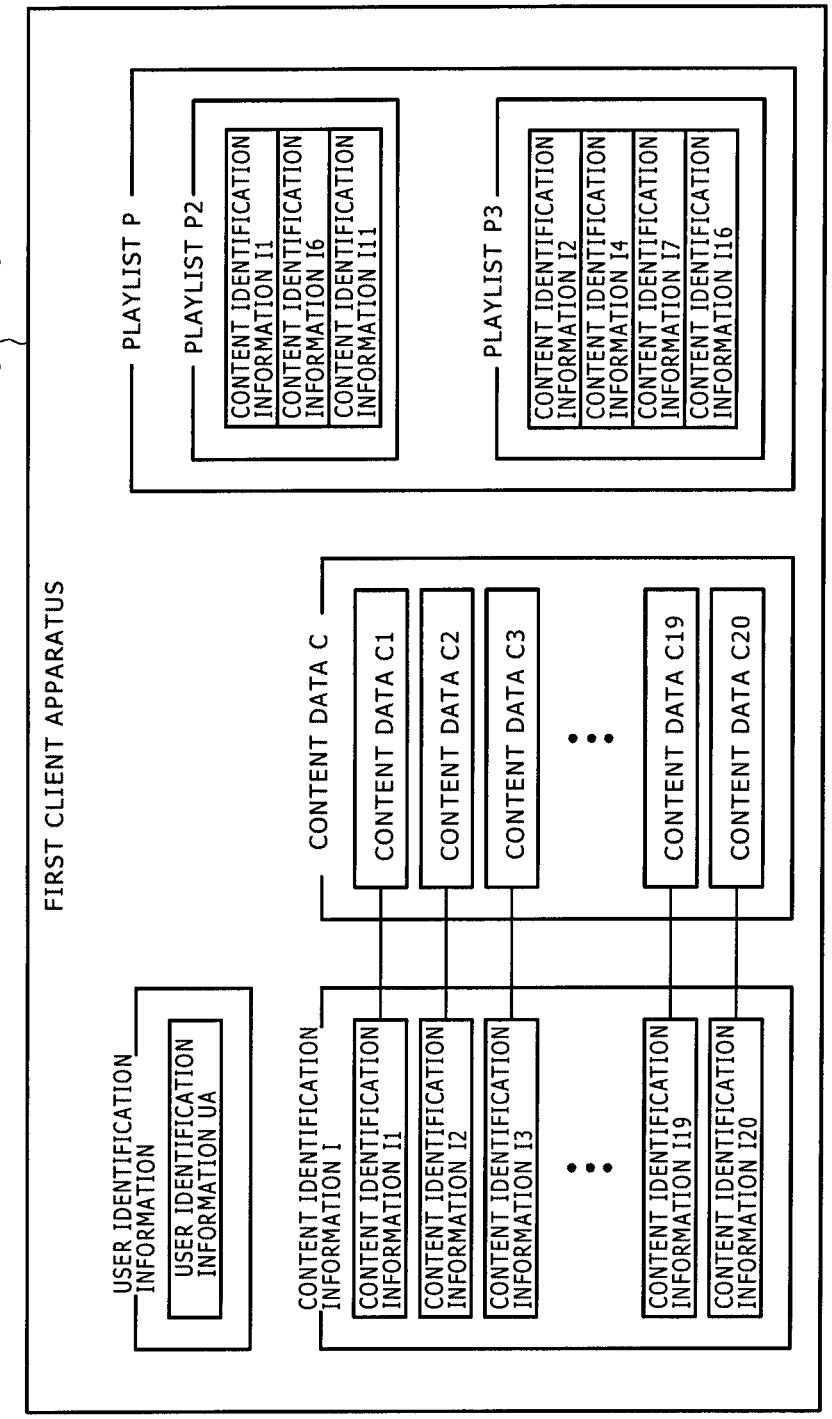
FIG. 3 is a diagrammatic view illustrating an example of various kinds of information retained in a first client apparatus shown in FIG. 1.

1-3. Example of Various Kinds of Information Retained in the First Client Apparatus FIG. 3 illustrates an example of various kinds of information retained by the first client apparatus 100A1 in the present embodiment. The example of various kinds of information retained by the first client apparatus 100A1 is described below with reference to FIG. 3.

The first client apparatus 100A1 in the present embodiment has stored therein content data C and content identification information I for identifying the content data C. Further, the first client apparatus 100A1 can store user identification information UA for identifying the user A who uses the first client apparatus 100A1. The user identification information UA may be any information if it is for the identification of the user A. For example, the user identification information UA may be an ID allocated uniquely to the user A, the name of the user A or the like. The user identification information UA may be registered in advance in the first client apparatus 100A1 or may be inputted to the first client apparatus 100A1 by the user A when this becomes necessary.

Further, the first client apparatus 100A1 can store playlists P. In the example illustrated in FIG. 3, a playlist P2 and a playlist P3 are registered in advance as the playlists P in the first client apparatus 100A1. The playlists P are information which represents the content identification information I of a plurality of contents arranged in the order of reproduction.

Figure 4:
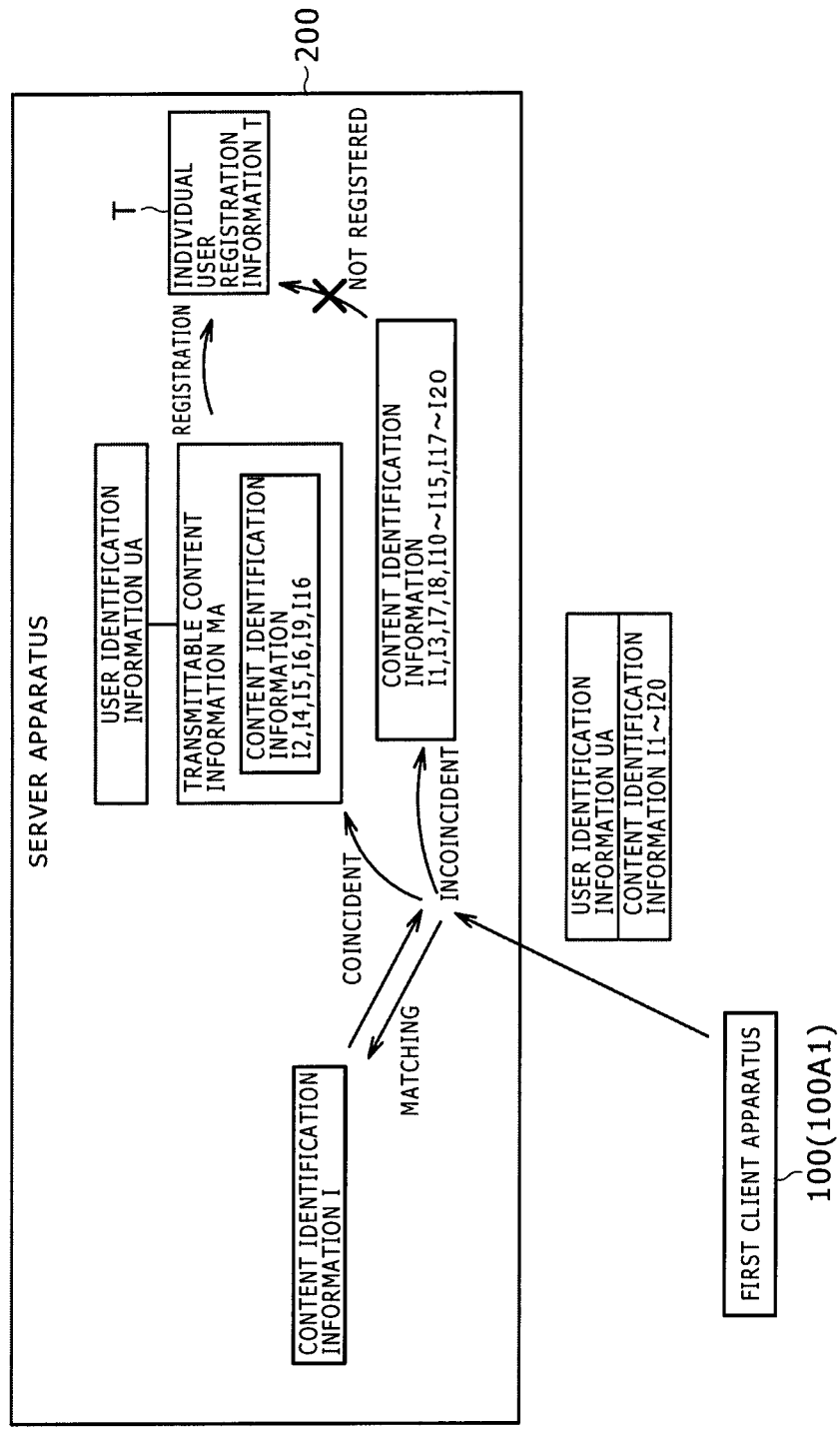
FIG. 4 is a diagrammatic view illustrating a flow of processing when content identification information is registered into the server apparatus by the first client apparatus.

1-4. Process by the First Client Apparatus of Registering Content Identification Information FIG. 4 illustrates a flow of processing when content identification information I is registered into the server apparatus 200 by the first client apparatus 100A1 in the present embodiment. The flow of processing when content identification information I is registered into the server apparatus 200 by the first client apparatus 100A1 is described with reference to FIG. 4.

For example, it is assumed that the first client apparatus 100A1 transmits a registration request including user identification information UA and content identification information I1 to I20 to the server apparatus 200 by a predetermined operation by the user A who uses the first client apparatus 100A1. When the server apparatus 200 receives the registration request from the first client apparatus 100A1, it decides whether or not the content identification information I1 to I20 included in the registration request is registered therein. In particular, the server apparatus 200 carries matching between the content identification information I1 to I20 included in the registration request and the content identification information I registered therein.

If it is assumed that such content identification information I as illustrated in FIG. 2 is registered in the server apparatus 200, then the server apparatus 200 decides that, from within the content identification information I1 to I20 included in the registration request, the content identification information I1, I3, I7, I8, I10 to I15, and I17 to I20 are not registered therein. In other words, the server apparatus 200 decides that, from within the content identification information I1 to I20 included in the registration request, the content identification information I1, I3, I7, I8, I10 to I15, and I17 to I20 are incoincident with the content identification information I registered in the server apparatus 200. In this instance, the server apparatus 200 does not register the individual user registration information TA, which associates the content identification information I1, I3, I7, I8, I10 to I15, and I17 to I20 and the user identification information UA with each other, into the individual user registration information T in principle.

On the other hand, if it is assumed that such content identification information I as illustrated in FIG. 2 is registered in the server apparatus 200, then the server apparatus 200 decides that, from within the content identification information I1 to I20 included in the registration request, the content identification information I2, I4, I5, I6, I9 and I16 registered therein. In other words, the server apparatus 200 decides that, from within the content identification information I1 to I20 included in the registration request, the content identification information I2, I4, I5, I6, I9 and I16 coincide with the content identification information I registered therein. In this instance, the server apparatus 200 registers the individual user registration information TA, which associates the content identification information I2, I4, I5, I6, I9 and I16 and the user identification information UA with each other, into the individual user registration information T.

1-5. Process by the First Client Apparatus of Registering a Playlist

Figure 5:
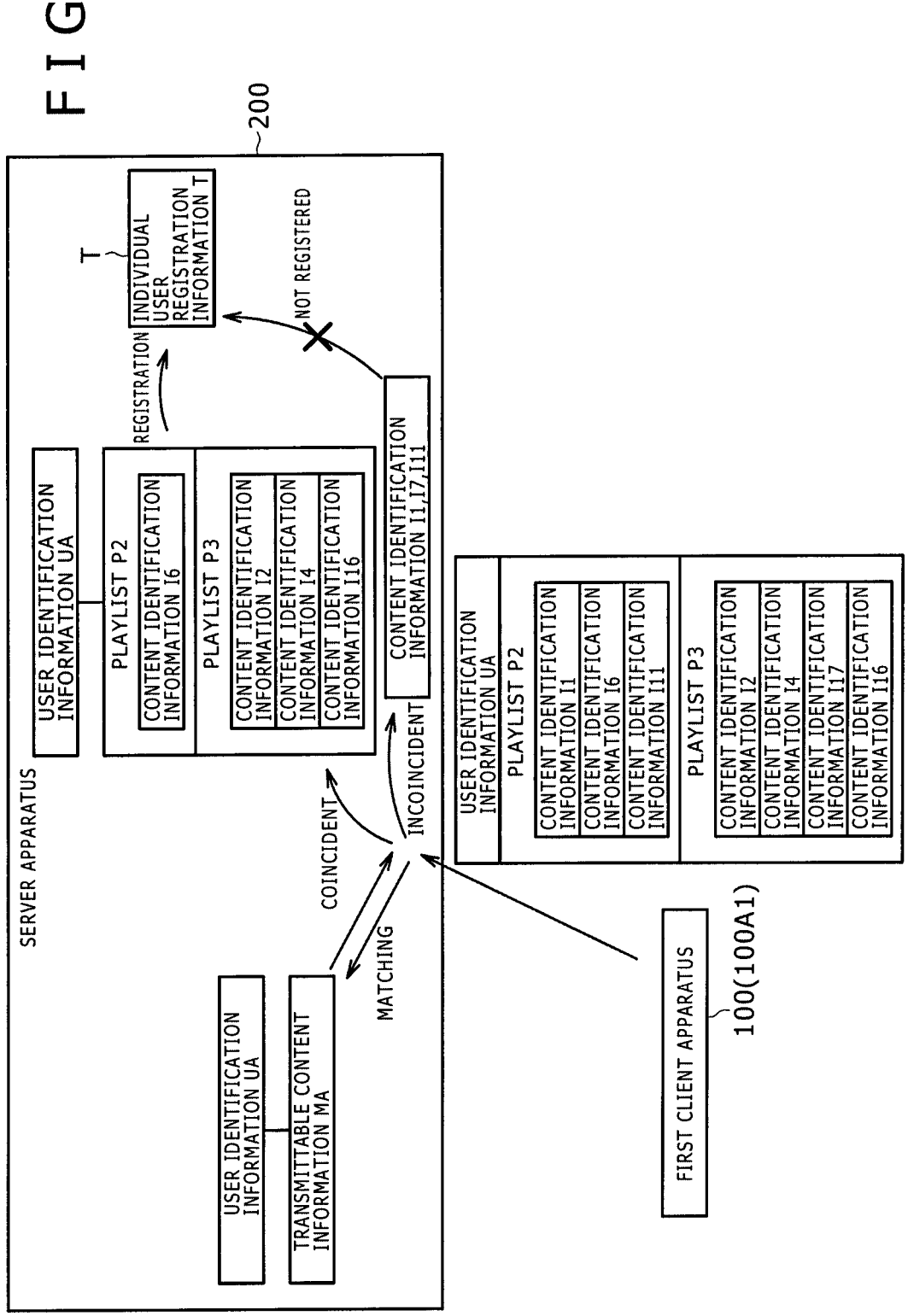
FIG. 5 is a diagrammatic view illustrating a flow of processing when a playlist is registered into the server apparatus by the first client apparatus.

FIG. 5 illustrates a flow of processing when a playlist is registered into the server apparatus 200 by the first client apparatus 100A1 in the present embodiment. The flow of processing when a playlist is registered into the server apparatus 200 by the first client apparatus 100A1 is described below with reference to FIG. 5.

It is assumed that, for example, the first client apparatus 100A1 transmits a registration request including user identification information UA and playlists P2 and P3 to the server apparatus 200 by a predetermined operation by the user A who uses the first client apparatus 100A1. When the server apparatus 200 receives the registration request from the first client apparatus 100A1, it decides whether or not content identification information I1, I6 and I11 included in the playlist P2 included in the registration request are registered in the transmittable content information MA corresponding to the user identification information UA included in the registration request. In particular, the server apparatus 200 carries out matching between the content identification information I1, I6 and I11 included in the playlist P2 included in the registration request and the transmittable content information MA corresponding to the user identification information UA included in the registration request.

If it is assumed that such transmittable content information MA as illustrated in FIG. 5 is registered in the server apparatus 200, then the server apparatus 200 decides that, from within the content identification information I1, I6 and I11 included in the playlist P2 included in the registration request, the content identification information I1 and I11 are not registered in the transmittable content information MA. In other words, the server apparatus 200 decides that, from within the content identification information I1, I6 and I11 included in the playlist P2 included in the registration request, the content identification information I1 and I11 are incoincident with the transmittable content information MA registered therein. In this instance, the server apparatus 200 does not register the content identification information I1 and I11 into the individual user registration information T in principle.

On the other hand, if it is assumed that such transmittable content information MA as illustrated in FIG. 5 is registered in the server apparatus 200, then the server apparatus 200 decides that, from within the content identification information I1, I6 and I11 included in the playlist P2 included in the registration request, the content identification information I6 is registered therein. In other words, the server apparatus 200 decides that, from within the content identification information I1, I6 and I11 included in the playlist P2 included in the registration request, the content identification information I6 coincides with the transmittable content information MA registered therein. In this instance, the server apparatus 200 registers an individual user registration, which associates the playlist P2 in which the content identification information I6 remains but the content identification information I1 and I11 do not remain and the user identification information UA with each other, into the individual user registration information T.

Similarly, when the server apparatus 200 receives the registration request described above from the first client apparatus 100A1, it decides whether or not content identification information I2, I4, I7 and I16 included in the playlist P3 included in the registration request are registered in the transmittable content information MA corresponding to the user identification information UA included in the registration request. In particular, the server apparatus 200 carries out matching between the content identification information I2, I4, I7 and I16 included in the playlist P3 included in the registration request and the transmittable content information MA corresponding to the user identification information UA included in the registration request.

If it is assumed that such transmittable content information MA as illustrated in FIG. 5 is registered in the server apparatus 200, then the server apparatus 200 decides that, from within the content identification information I2, I4, I7 and I16 included in the playlist P3 included in the registration request, the content identification information I7 is not registered in the transmittable content information MA. In other words, the server apparatus 200 decides that, from within the content identification information I2, I4, I7 and I16 included in the playlist P3 included in the registration request, the content identification information I7 is incoincident with the transmittable content information MA registered in the server apparatus 200. In this instance, the server apparatus 200 does not register the content identification information I7 into the individual user registration information T in principle.

On the other hand, if it is assumed that such transmittable content information MA as illustrated in FIG. 5 is registered in the server apparatus 200, then the server apparatus 200 decides that, from within the content identification information I2, I4, I7 and I16 included in the playlist P3 included in the registration request, the content identification information I2, I4 and I16 are registered therein. In other words, the server apparatus 200 decides that, from within the content identification information I2, I4, I7 and I16 included in the playlist P3 included in the registration request, the content identification information I2, I4 and I16 coincide with the transmittable content information MA registered therein. In this instance, the server apparatus 200 registers an individual user registration, which associates the playlist P3 in which the content identification information I2, I4 and I16 remain but the content identification information I7 does not remain and the user identification information UA with each other, into the individual user registration information T.

It is to be noted that, while, in the example illustrated in FIG. 5, the server apparatus 200 carries out matching between the playlists P2 and P3 included in the registration request and the transmittable content information MA, the matching method is not limited to this. For example, the server apparatus 200 may carry out matching between the playlists P2 and P3 included in the registration request and the content identification information I registered in the server apparatus 200. Or, the server apparatus 200 may not carry out matching but may register information, which associates the user identification information UA included in the registration request and the playlists P2 and P3 with each other, as it is into the individual user registration information T.

1-6. Process by the Second Client Apparatus of Using Content Data

Figure 6:
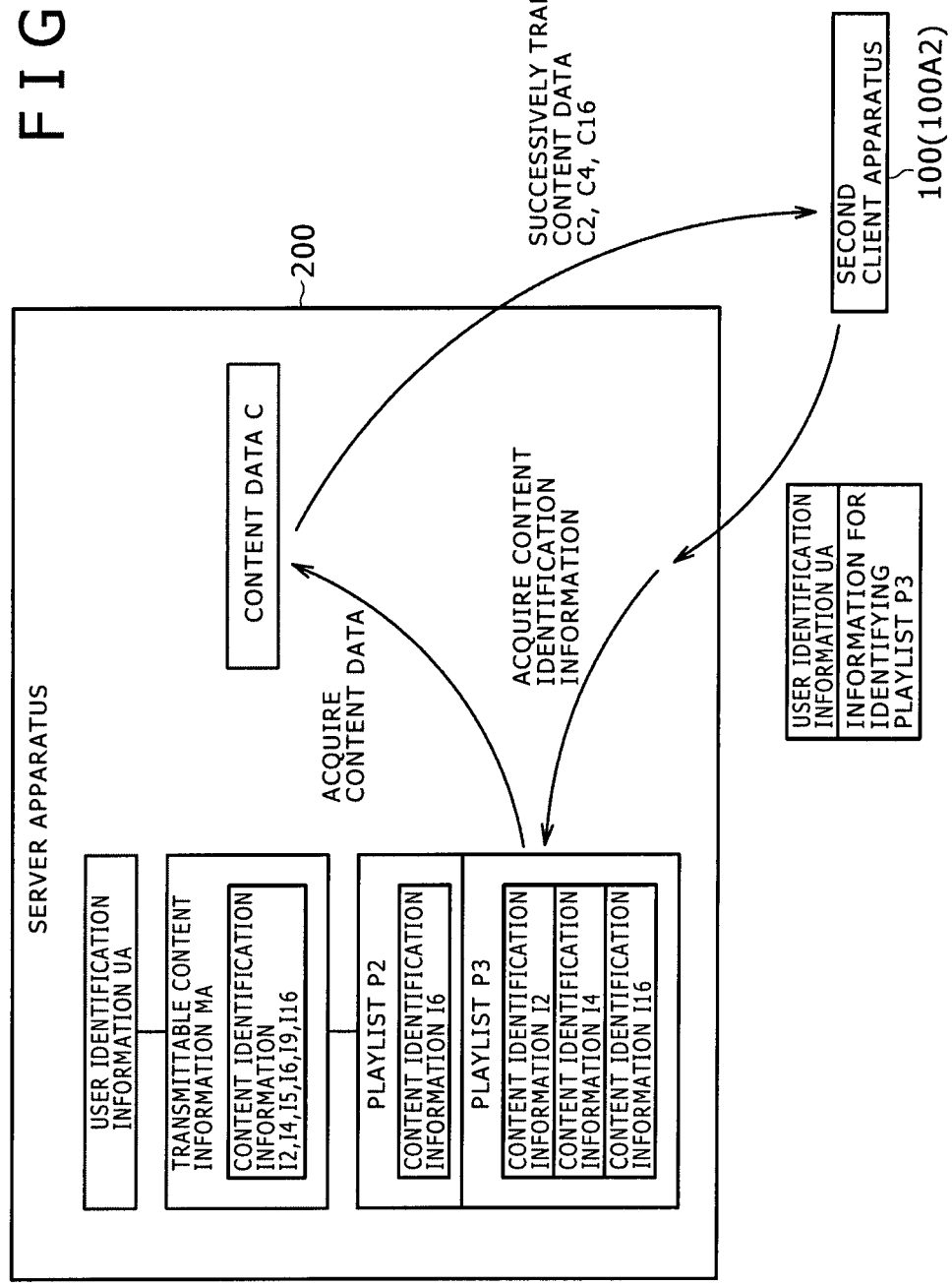
FIG. 6 is a diagrammatic view illustrating a flow of processing when content data is used by a second client apparatus shown in FIG. 1 in accordance with a playlist registered in the server apparatus.

FIG. 6 illustrates a flow of processing when content data are used by the second client apparatus 100A2 in accordance with a playlist registered in the server apparatus 200 in the present embodiment. The flow of processing when content data are used by the second client apparatus 100A2 in accordance with a playlist registered in the server apparatus 200 is described with reference to FIG. 6.

As a result of carrying out of the registration processes illustrated in FIGS. 4 and 5, the server apparatus 200 in the present embodiment has stored therein information which associates the user identification information UA, transmittable content information MA and playlists P2 and P3 with each other as shown in FIG. 6.

Here, it is assumed that, for example, the second client apparatus 100A2 transmits a content transmission request including the user identification information UA and the information for identifying the playlist P3 to the server apparatus 200 by a predetermined operation by the user A who uses the second client apparatus 100A2. When the server apparatus 200 receives the content transmission request from the second client apparatus 100A2, it refers to a playlist P registered in association with the user identification information UA included in the content transmission request. Then, the server apparatus 200 acquires the content identification information I2, I4 and I16 from the playlist P3 identified based on the information for the identification of the playlist P3 included in the content transmission request.

Then, the server apparatus 200 acquires content data C2, C4 and C16 identified based on the acquired content identification information I2, I4 and I16 from the content data C and successively transmits the acquired content data C2, C4 and C16 to the second client apparatus 100A2. The second client apparatus 100A2 successively receives the content data C2, C4 and C16 and can stream reproduce the content data C2, C4 and C16, for example, in the order of the reception.

While the example wherein the second client apparatus 100A2 successively receives the content identification information I2, I4 and I16 included in the playlist P3 to carry out stream reproduction is described above with reference to FIG. 6, the second client apparatus 100A2 may otherwise directly transmit the content identification information I to the server apparatus 200. In this instance, for example, the second client apparatus 100A2 transmits a content transmission request including the user identification information UA and the content identification information I to the server apparatus 200.

When the server apparatus 200 receives this content transmission request from the second client apparatus 100A2, it refers to the transmittable content information MA registered in association with the user identification information UA included in the content transmission request. Then, the server apparatus 200 acquires the content data C identified based on the content identification information I included in the content transmission request. Then, the server apparatus 200 acquires the content data C identified based on the acquired content identification information I and transmits the acquired content data C2 to the second client apparatus 100A2. The second client apparatus 100A2 receives the content data C and can, for example, stream reproduce the content data C.

It is to be noted here that, while the example wherein the second client apparatus 100A2 stream reproduces the content data C received from the server apparatus 200 is described above, the second client apparatus 100A2 may not necessarily stream reproduce the content data C received from the server apparatus 200. Also it is possible for the second client apparatus 100A2 to retain the content data C received from the server apparatus 200 and reproduce the content data C offline.

As described above with reference to FIGS. 3 to 6, the individual user registration information TA regarding the user A can be registered into the server apparatus 200 by the first client apparatus 100A1. It is assumed that the content identification information I2 is registered as the transmittable content information MA of the individual user registration information TA. In this instance, the second client apparatus 100A2 transmits a content transmission request including the user identification information UA and the content identification information I2 to the server apparatus 200. The second client apparatus 100A2 can thus receive the content data C2 identified based on the content identification information I2.

On the other hand, the first client apparatus 100A1 may not register the content identification information I3 as the transmittable content information MA of the individual user registration information TA. In this instance, if a transmission request including the user identification information UA and the content identification information I3 is transmitted to the server apparatus 200, then the second client apparatus 100A2 cannot receive the content data C3 identified based on the content identification information I3.

According to the embodiment described above, the content identification information I for identifying the content data C which can be used by the first client apparatus 100A1 can be registered into the server apparatus 200. In the case where the user A who uses the first client apparatus 100A1 can use also the second client apparatus 100A2, the second client apparatus 100A2 can download the content data C, which is identified based on the content identification information I registered by the first client apparatus 100A1, from the server apparatus 200. Consequently, the time and labor for uploading the content data C from the first client apparatus 100A1 into the server apparatus 200 in order to allow the content data C to be used by the second client apparatus 100A2 can be reduced.

Further, the protocol used for use of content data may possibly be different between the first client apparatus 100A1 and the second client apparatus 100A2. In this instance, if content data is transmitted directly from the first client apparatus 100A1 to the second client apparatus 100A2, then the second client apparatus 100A2 must convert the content data transmitted from the first client apparatus 100A1 into content data suitable for the protocol used by the second client apparatus 100A2 itself. According to the present embodiment, since it is possible to register content data C in accordance with a protocol used by each client apparatus 100 in advance into the server apparatus 200, there is an advantage also that the second client apparatus 100A2 need not convert the content data C into content data of the format suitable for the second client apparatus 100A2 itself.

1-7. Functional Configuration of the First Client Apparatus

Figure 7:
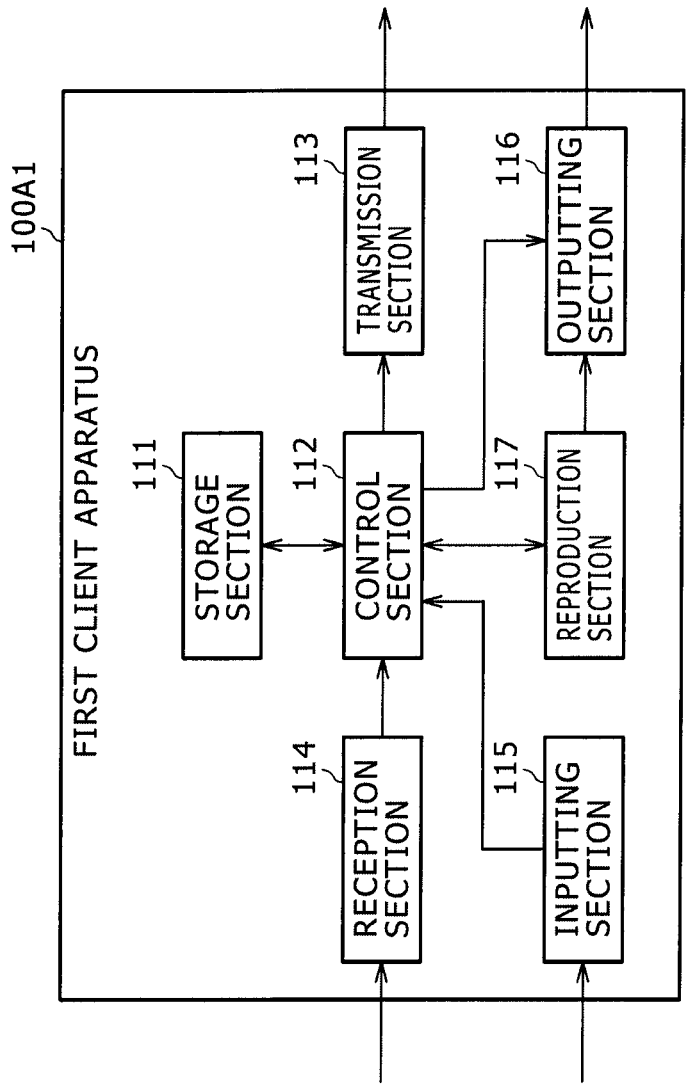
FIG. 7 is a block diagram showing a functional configuration of the first client apparatus.

FIG. 7 shows a functional configuration of the first client apparatus 100A1 according to the embodiment of the disclosed technology. The functional configuration of the first client apparatus 100A1 is described below with reference to FIG. 7.

The first client apparatus 100A1 at least includes a storage section 111, a control section 112, and a transmission section 113 as shown in FIG. 7. As occasion demands, the first client apparatus 100A1 further includes a reception section 114, an inputting section 115, an outputting section 116, a reproduction section 117 and so forth.

The storage section 111 can store content data and so forth, and content data stored in the storage section 111 may be acquired by the control section 112. Also content data may be registered into the storage section 111 by the control section 112. The registration of content data into the storage section 111 is controlled by the control section 112, for example, based on an operation inputted from the user A through the inputting section 115. The content data to be registered into the storage section 111 may be those received by the reception section 114 or may be those inputted through the inputting section 115. The storage section 111 is configured from a storage device such as, for example, a hard disk drive (HDD).

The control section 112 has a function of acquiring content identification information for identifying content data stored in the storage section 111. Various methods are available for acquiring content identification information for identifying content data stored in the storage section 111, and the acquisition method is not limited particularly. For example, in the case where content identification information is added to the content data stored in the storage section 111, the content identification information added to the content data can be acquired. Or, for example, if an analysis result obtained by carrying out an analysis of part or the entirety of the content data is inputted, then content identification information can be obtained using a predetermined server which outputs content identification information for identifying the content data based on the analysis result.

The control section 112 further has a function of controlling operation of functioning blocks in the first client apparatus 100A1. The control section 112 is configured, for example, from a CPU (Central Processing Unit), a RAM (Random Access Memory) and so forth, and the CPU develops a program stored in the storage section 111 into the RAM and executes the program to implement the functions of the control section 112. However, the configuration of the control section 112 is not limited to this, but the control section 112 may be configured from hardware for exclusive use.

The transmission section 113 has a function of transmitting a registration request including user identification information for identifying the user who uses the first client apparatus 100A1 itself and content identification information acquired by the control section 112 to the server apparatus 200. The transmission section 113 further has a function of causing, in the case where the server apparatus 200 retains the content data identified based on the content identification information included in the registration request, the server apparatus 200 to retain the information, which associates the user identification information and the content identification information included in the registration request with each other, as individual user registration information. Consequently, content data retained by the first client apparatus 100A1 and further retained by the server apparatus 200 can be downloaded from the server apparatus 200 to the second client apparatus 100A2. The transmission section 113 is configured, for example, from a communication device.

Also a case may possibly occur in which the server apparatus 200 does not retain the content data identified based on the content identification information included in the registration request. In this instance, the transmission section 113 may possibly carry out processing in various manners. For example, in the case where the server apparatus 200 does not retain the content data identified based on the content identification information included in the registration request, the transmission section 113 may inhibit the retention of the individual user identification information by the server apparatus 200. By such inhibition, content data which is retained by the first client apparatus 100A1 but is not retained by the server apparatus 200 cannot be downloaded from the server apparatus 200 to the second client apparatus 100A2.

Or, for example, in the case where the server apparatus 200 does not retain the content data identified based on the content identification information included in the registration request, the transmission section 113 can cause the server apparatus 200 to retain the individual user registration information. In this instance, also it is possible for the transmission section 113 to transmit the content data stored in the storage section 111 to the server apparatus 200 so that the server apparatus 200 may retain the content data. By such retention, content data which is retained by the first client apparatus 100A1 but is not retained by the server apparatus 200 can be uploaded from the first client apparatus 100A1 to the server apparatus 200 and then downloaded to the second client apparatus 100A2.

The storage section 111 may further store a playlist. In this instance, the control section 112 can acquire the playlist stored in the storage section 111. Further, the transmission section 113 can transmit the playlist to the server apparatus 200. Then, it is possible for the transmission section 113 to cause a list obtained by removing content identification information which is not included in the individual user registration information from the playlist to be retained in association with the user identification information included in the registration request into the server apparatus 200. By registering the list obtained by removing the content information not included in the individual user registration information from the playlist, only content identification information for identifying content data which can be downloaded from the server apparatus 200 can be registered as a playlist into the server apparatus 200.

However, only content identification information for identifying content data which can be downloaded from the server apparatus 200 may not necessarily be registered as a playlist into the server apparatus 200. for example, the transmission section 113 may cause the server apparatus 200 to unconditionally retain a playlist stored in the storage section 111. In particular, the control section 112 may acquire a playlist stored in the storage section 111, and the transmission section 113 may transmit the playlist further to the server apparatus 200 such that the server apparatus 200 may retain the playlist in an associated relationship with the user identification information. Or, the transmission section 113 may cause the list obtained by removing content identification information which is not included in content identification information retained by the server apparatus 200 from the playlist to be retained in an associated relationship with the user identification information included in the registration request into the server apparatus 200.

The reception section 114 has a function of receiving various kinds of information from the server apparatus 200 through the network 30. The reception section 114 has a function of receiving, for example, if a request produced by the control section 112 based on an operation inputted through the inputting section 115 is transmitted by the transmission section 113, a response to the request from the server apparatus 200. Further, the reception section 114 can receive also content data to be stored into the storage section 111. Further, the reception section 114 can cause content data received from the server apparatus 200 to be reproduced by the reproduction section 117 under the control of the control section 112. The reception section 114 is configured, for example, from a communication device.

The inputting section 115 has a function of accepting an operation from the user and outputting the accepted operation as an operation signal to the control section 112. The inputting section 115 is configured, for example, from an inputting device. For example, in response to an operation inputted through the inputting section 115, a corresponding request is produced by the control section 112. The request produced by the control section 112 is transmitted to the server apparatus by the transmission section 113.

The outputting section 116 has a function of outputting various kinds of information and various requests under the control of the control section 112. Further, the outputting section 116 has a function of outputting content data reproduced by the reproduction section 117. For example, if the content data is sound data, then the outputting section 116 may be configured from a sound outputting device such that the sound outputting device outputs sound based on the sound data. Meanwhile, if the content data is image data, then the outputting section 116 may be configured from a display device such that the display device outputs an image based on the image data.

The reproduction section 117 can reproduce content data received from the server apparatus 200 under the control of the control section 112. For example, the reproduction section 117 can stream reproduce content data received from the server apparatus 200. However, the reproduction section 117 may not necessarily stream reproduce content data received from the server apparatus 200. The reproduction section 117 may reproduce content data received from the server apparatus 200 by the reception section 114 by offline reproduction.

1-8. Functional Configuration of the Server Apparatus

Figure 8:
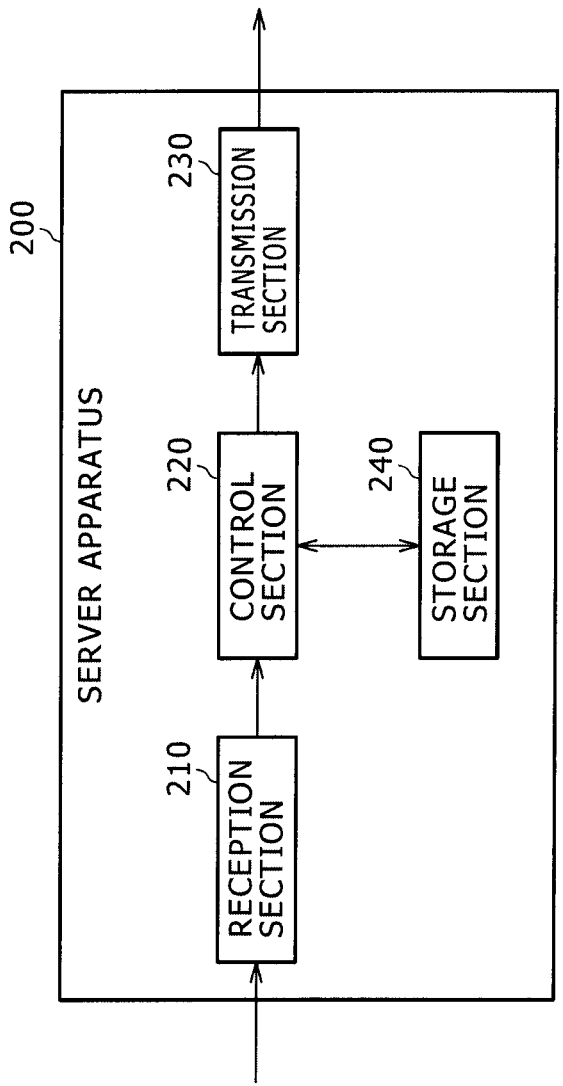
FIG. 8 is a block diagram showing a functional configuration of the server apparatus.

FIG. 8 shows a functional configuration of the server apparatus 200 in the embodiment of the disclosed technology. The functional configuration of the server apparatus 200 is described below with reference to FIG. 8.

The server apparatus 200 includes at least a storage section 240, a reception section 210, and a control section 220. As occasion demands, the server apparatus 200 additionally includes a transmission section 230.

The storage section 240 can store content data, individual user registration information and so forth, and content data stored in the storage section 240 can be acquired by the control section 220. Further, content data can be registered into the storage section 240 by the control section 220. The registration of content data into the storage section 240 is controlled, for example, by the control section 220. The server apparatus 200 can retain various kinds of information, for example, by storing the various kinds of information into the storage section 240. Content data to be registered into the storage section 240 may be those received by the reception section 210. The storage section 240 is configured from a storage device such as, for example, a HDD.

The reception section 210 has a function of receiving various kinds of information and various requests from the first client apparatus 100A1 or the second client apparatus 100A2 through the network 30. If a request is received from the first client apparatus 100A1 or the second client apparatus 100A2 through the network 30, then the reception section 210 outputs the request to the control section 220, and a response to the request is produced by the control section 220. Further, the reception section 210 has a function of receiving registration information from the first client apparatus 100A1. The reception section 114 is configured, for example, from a communication device.

The control section 220 has a function of storing, in the case where content data identified based on content identification information included in a registration request received by the reception section 210 is stored in the storage section 240, information which associates the user identification information and the content identification information included in the registration request with each other, as individual user registration information into the storage section 240. The control section 220 is configured, for example, from a CPU, a RAM and so forth, and the CPU develops a program stored in the storage section 240 into the RAM and executes the program to implement the functions of the control section 220. However, the configuration of the control section 220 is not limited to this, but the control section 220 may be configured otherwise by hardware for exclusive use.

The transmission section 230 has a function of transmitting various kinds of information or various responses to the first client apparatus 100A1 or the second client apparatus 100A2 through the network 30 based on the control by the control section 220. The transmission section 230 is configured, for example, from a communication device.

1-9. Functional Configuration of the Second Client Apparatus

Figure 9:
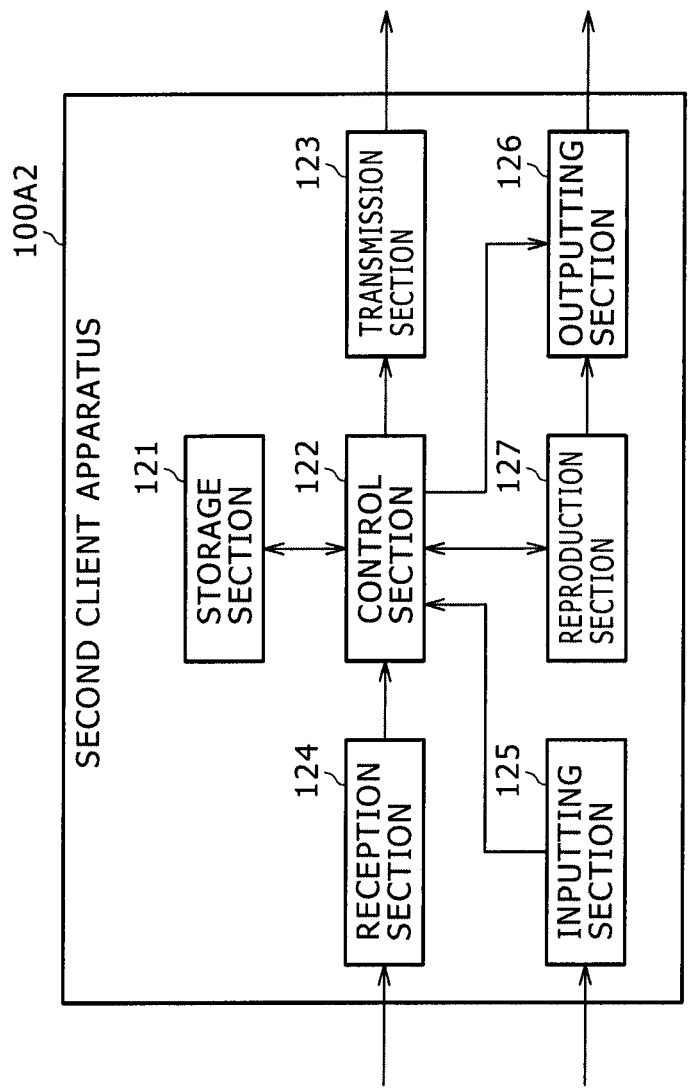
FIG. 9 is a block diagram showing a functional configuration of the second client apparatus.

FIG. 9 shows a functional configuration of the second client apparatus 100A2 in the embodiment of the disclosed technique. In the following, the functional configuration of the second client apparatus 100A2 is described with reference to FIG. 9.

The second client apparatus 100A2 includes at least a control section 122, a transmission section 123 and a reception section 124. Further, as occasion demands, the second client apparatus 100A2 additionally includes a storage section 121, an inputting section 125, an outputting section 126, a reproduction section 127, and so forth.

The control section 122 has a function of acquiring content identification information designated by a user who uses the second client apparatus 100A2 as selection information. The control section 122 can acquire content identification information, for example, designated by an operation inputted by the user through the inputting section 125 as selection information. The control section 122 further has a function of controlling operation of the functioning blocks in the second client apparatus 100A2.

The control section 122 is configured, for example, from a CPU, a RAM and so forth, and the CPU develops a program stored in the storage section 121 into the RAM and executes the program to implement the functions of the control section 122. However, the configuration of the control section 122 is not limited to this, and the control section 122 may otherwise be configured from hardware for exclusive use.

The transmission section 123 has a function of transmitting a content transmission request including user identification information for identifying the user and selection information acquired by the control section 122 to the server apparatus 200. Further, the transmission section 123 has a function of causing, in the case where information which associates the user identification information and the selection information included in the transmitted content transmission request with each other is retained as individual user registration information by the server apparatus 200, the server apparatus 200 to execute transmission of the content data identified based on the selection information as a response to the content transmission request.

Consequently, content data which is retained by the first client apparatus 100A1 and besides retained by the server apparatus 200 can be downloaded from the server apparatus 200 to the second client apparatus 100A2. The content data transmitted from the server apparatus 200 is received by the reception section 124 of the second client apparatus 100A2 from which the content transmission request has been transmitted. The transmission section 123 is configured, for example, from a communication device.

The reception section 124 has a function of receiving various kinds of information from the server apparatus 200 through the network 30. The reception section 124 has a function of receiving, in the case where a request produced by the control section 122, for example, based on an operation inputted through the inputting section 125 is transmitted by the transmission section 123, a response to the request from the server apparatus 200. Further, as described hereinabove, the reception section 124 can receive also content data to be stored into the storage section 121. Further, the reception section 124 can cause content data received from the server apparatus 200 to be reproduced by the reproduction section 127 under the control of the control section 122. The reception section 124 is configured, for example, from a communication device.

Also a case may possibly occur in which the server apparatus 200 does not retain the content data identified based on the content identification information included in the content transmission request. In this instance, the transmission section 113 may possibly carry out processing in various manners. For example, in the case where the server apparatus 200 does not retain the selection information included in the content transmission request in an associated relationship as content identification information with the user identification information, the transmission section 123 can inhibit the transmission of the content data identified based on the selection information by the server apparatus 200. By such inhibition, content data which is retained by the first client apparatus 100A1 but is not retained by the server apparatus 200 cannot be downloaded from the server apparatus 200 to the second client apparatus 100A2.

The second client apparatus 100A2 may have a function of transmitting a registration request to the server apparatus 200 to register individual user registration information into the server apparatus 200. In this instance, the second client apparatus 100A2 may further include a storage section 121 which stores content data. Then, the control section 122 acquires content identification information for identifying the content data stored in the storage section 121 and the transmission section 123 transmits a registration request which includes user identification information for identifying the user A who uses the second client apparatus 100A2 and the content identification information acquired by the control section 122 to the server apparatus 200. If the server apparatus 200 retains the content data identified based on the content identification information included in the registration request, then the transmission section 123 causes the server apparatus 200 to retain information which associates the user identification information and the content identification information included in the registration request with each other as individual user registration information.

Various methods are available for acquiring content identification data for identifying the content data stored in the storage section 121, and the acquisition method is not limited particularly. For example, in the case where content identification information is added to content data stored in the storage section 121, the content identification information added to the content data can be acquired. Or, for example, if an analysis result obtained by carrying out an analysis of part or the entirety of the content data is inputted, then content identification information can be obtained using a predetermined server which outputs content identification information for identifying the content data based on the analysis result.

The storage section 121 can keep content data, playlists and so forth stored therein, and content data stored in the storage section 121 can be acquired by the control section 122. Further, content data can be registered into the storage section 121 from the control section 122. The registration of content data into the storage section 121 is controlled by the control section 122, for example, based on an operation inputted from the user A through the inputting section 125. The content data to be registered into the storage section 121 may be those received by the reception section 124 or may be those inputted through the inputting section 125. The storage section 121 is configured from a storage device such as, for example, a HDD.

The second client apparatus 100A2 may be configured such that it can register individual user registration information into the server apparatus 200 similarly to the first client apparatus 100A1. However, the second client apparatus 100A2 may be configured otherwise such that it can register individual user identification information into the server apparatus 200 by a method different from that of the first client apparatus 100A1.

For example, the transmission section 123 transmits a registration request including user identification information for identifying the user A who uses the second client apparatus 100A2 and content identification information acquired by the control section 122 to the server apparatus 200. Then, if the server apparatus 200 retains the content data identified based on the content identification information included in the registration request, then the transmission section 123 may allow individual user registration information retained already by the server apparatus 200 to be continuously retained by the server apparatus 200 and add the information, which associates the user identification information and the content identification information included in the registration request with each other, to the individual user registration information.

By registering the individual user registration information in this manner, the transmission section 123 can add the difference between the content identification information registered already and the content identification information included in the registration request to the individual user registration information registered already in the server apparatus 200 while the individual user registration information registered already in the server apparatus 200 is left. Such a registration method as just described may be adopted in such a case that, for example, the user A uses the first client apparatus 100A1 as a main apparatus for registering individual user registration information into the server apparatus 200 but uses the second client apparatus 100A2 as an incidental apparatus for registering individual user registration information into the server apparatus 200.

The control section 122 can acquire a playlist stored in the storage section 121, and the transmission section 123 can transmit the playlist to the server apparatus 200. Then, the transmission section 123 can cause the server apparatus 200 to retain a list obtained by removing content identification information which is not included in the individual user registration information from the playlist in an associated relationship with the user identification information included in the registration request. By registering the list obtained by removing the content identification information not included in the individual user identification information from the playlist, only the content identification information for identifying the content data which can be downloaded from the server apparatus 200 can be registered as a playlist into the server apparatus 200.

However, only the content identification information for identifying content data which can be downloaded from the server apparatus 200 must not necessarily be registered as a playlist into the server apparatus 200. For example, it is possible for the transmission section 123 to cause the server apparatus 200 to unconditionally retain the playlist stored in the storage section 121. In particular, the control section 122 may acquire a playlist stored in the storage section 121, and the transmission section 123 may transmit the playlist to the server apparatus 200 so that the playlist is retained in an associated relationship with the user identification information into the server apparatus 200. Or, the transmission section 123 may cause a list obtained by removing content identification information which is not included in the content identification information retained by the server apparatus 200 from the playlist to be retained in an associated relationship with the user identification information included in the registration request into the server apparatus 200.

The inputting section 125 has a function of accepting an operation from a user and outputting the accepted operation as an operation signal to the control section 122. The inputting section 125 is configured, for example, from an inputting device. Based on an operation inputted, for example, through the inputting section 125, a request is produced by the control section 122 and transmitted to the server apparatus 200 from the transmission section 123.

The outputting section 126 has a function of outputting various kinds of information or various requests under the control of the control section 122. Further, the outputting section 126 has a function of outputting content data reproduced by the reproduction section 127. For example, if the content data is sound data, then the outputting section 126 may be configured from a sound outputting device, which outputs sound based on the sound data. On the other hand, if the content data is image data, then the outputting section 126 may be configured from a display device, which outputs an image based on the image data.

The reproduction section 127 can reproduce content data received from the server apparatus 200 under the control of the control section 122 as described hereinabove. While the reproduction section 127 can, for example, stream reproduce content data received from the server apparatus 200, it may not necessarily reproduce content data received from the server apparatus 200. The reproduction section 127 can reproduce content data received from the server apparatus 200 by the reception section 124 by offline reproduction.

1-10. Services Provided by the Individual Apparatus

Figure 10:
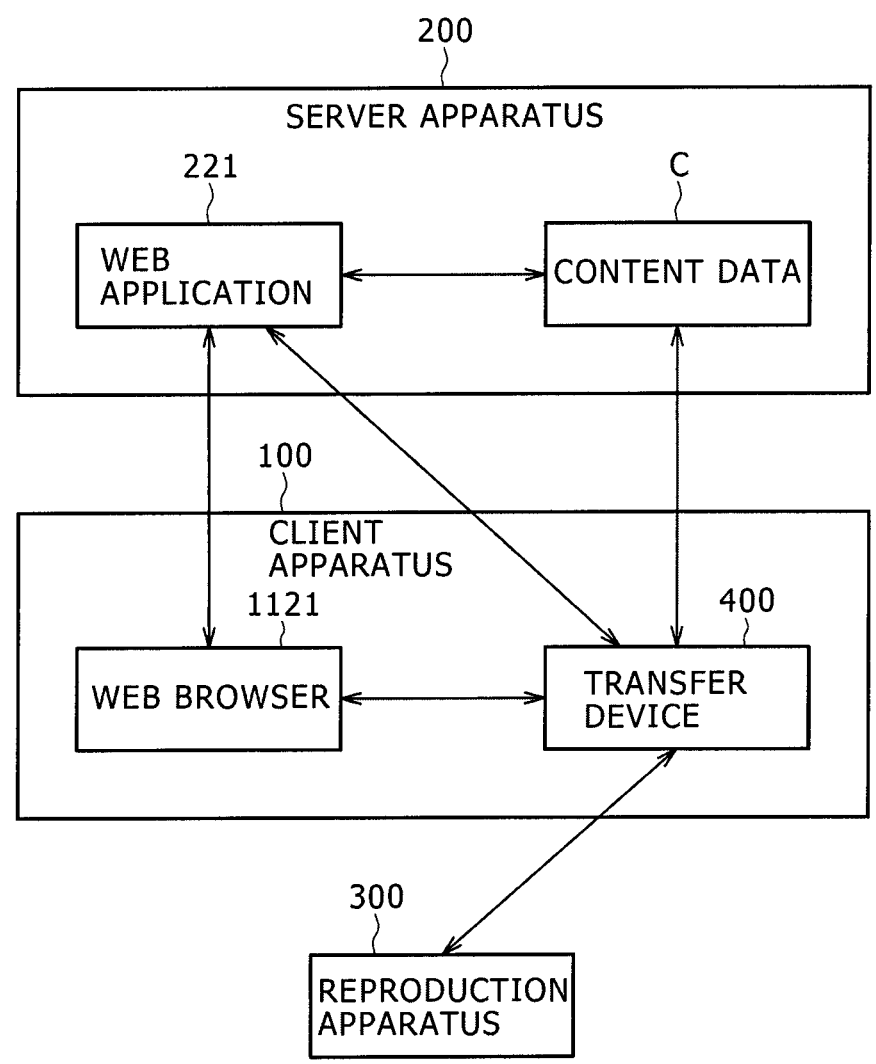
FIG. 10 is a block diagram illustrating services provided by the components of the information processing system.

FIG. 10 illustrates various services provided by the components of the information processing system 10 according to the embodiment of the disclosed technology. The services provided by the components of the information processing system 10 are described below with reference to FIG. 10.

As seen in FIG. 10, content data C exist on a cloud. The cloud in the present embodiment corresponds to the storage section 240 of the server apparatus 200. A Web application 221 is an interface for enjoying a cloud service from an on-line apparatus such as a PC (personal computer). In the present embodiment, the on-line apparatus corresponds to a client apparatus 100, and the Web application 221 is for implementing some of the functions of the control section 220 of the server apparatus 200. It is to be noted that the term on-line signifies a state in which the on-line apparatus is connected to the network 30.

The Web application 221 can be accessed from a Web browser 1121 provided by a client apparatus 100. The Web browser 1121 is an application for implementing some of the functions of the control section 120 of the client apparatus 100. A transfer device 400 has a function of acquiring a list of content data cached in the reproduction apparatus 300 which corresponds to an off-line apparatus, a function of caching content data into the reproduction apparatus 300 which corresponds to an off-line apparatus. While the transfer device 400 here is incorporated in the client apparatus 100, it may otherwise be incorporated in the server apparatus 200 or in the reproduction apparatus 300. In the case where the transfer device 400 is incorporated in the client apparatus 100, the Web browser 1121 may have some or all of the functions which the transfer device 400 has. It is to be noted that the term off-line signifies that the off-line apparatus is not connected to the network 30.

The Web application 221 issues an inquiry about a connection situation between the reproduction apparatus 300 which corresponds to an off-line apparatus and the client apparatus 100 which corresponds to an on-line apparatus to the transfer device 400. If connection between the reproduction apparatus 300 and the client apparatus 100 is confirmed, then the transfer device 400 transmits a list of acquired content data to the Web application 221. The Web application 221 receives the list information of content data and dynamically changes a UI (User Interface) to be provided to the Web browser 1121. Consequently, the Web browser 1121 can provide a UI which varies dynamically.

1-11. Example of Various Kinds of Information Retained by the Server Apparatus

Figure 11:
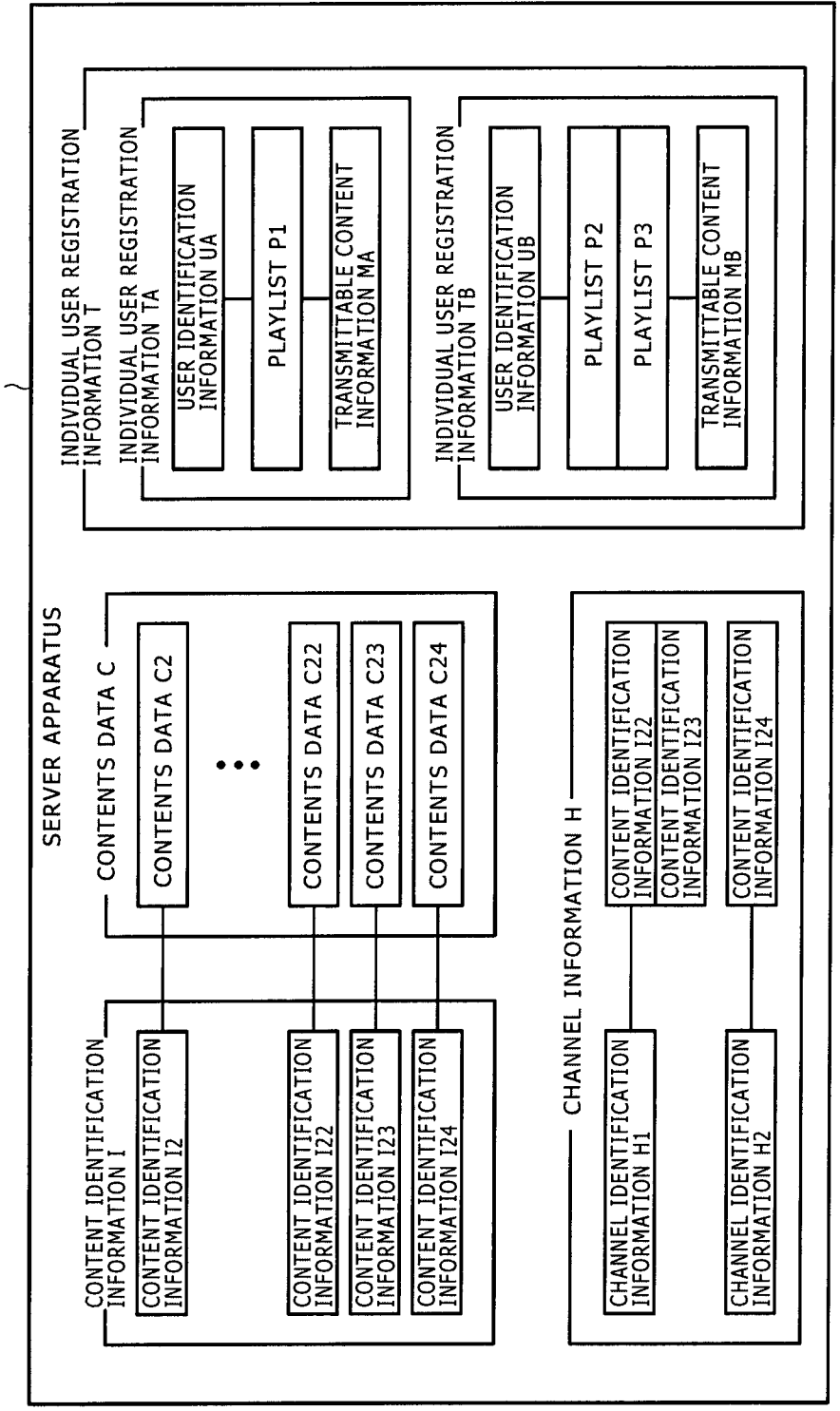
FIG. 11 is a diagrammatic view illustrating an example of various kinds of information retained in the server apparatus.

FIG. 11 illustrates an example of various kinds of information retained in the server apparatus 200 in the embodiment of the disclosed technology. The example of various kinds of information retained in the server apparatus 200 is described below with reference to FIG. 11.

The server apparatus 200 has stored therein content data C and content identification information I for identifying the content data C as shown in FIG. 11. Further, the server apparatus 200 can store individual user registration information T. In FIG. 11, individual user registration information TA regarding the user A and individual user registration information TB regarding the user B are registered as the individual user registration information T in the server apparatus 200. Although the individual user registration information TA or the individual user registration information TB can be registered into the server apparatus 200 by such a method as described hereinabove with reference to FIGS. 1 to 9, the method of registration of the individual user registration information TA or the individual user registration information TB is not limited particularly.

Further, the server apparatus 200 can store channel information configured from a combination of channel identification information for identifying a channel and content identification information of one or a plurality of contents. As seen in FIG. 11, a combination of channel identification information H1 and content identification information I22 and I23 and another combination of channel identification information H2 and content identification information I24 are registered as channel information H in the server apparatus 200. If the server apparatus 200 is notified of channel identification information by a content transmission request, then it can successively send back content data identified based on the content identification information combined with the channel identification information to the transmission source of the content transmission request.

1-12. Example of Display of Information Relating to Content Data

Figure 12:
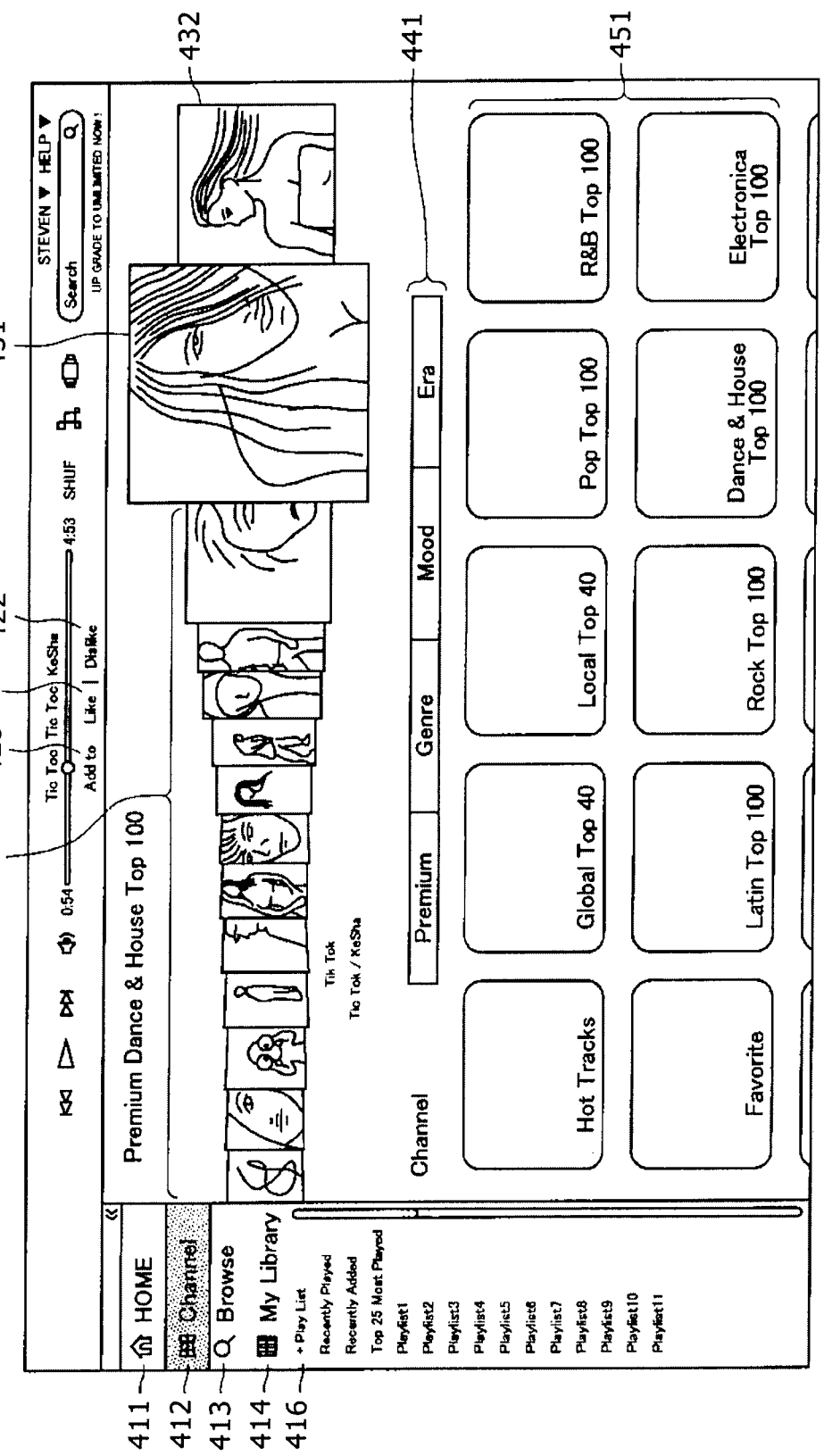
FIG. 12 is a schematic view showing an example of a display image in the case where information relating to content data retained in the server apparatus is displayed.

FIG. 12 shows an example of display in the case where information relating to content data retained in the server apparatus 200 in the embodiment of the disclosed document is displayed. An example of display in the case where information relating to content data retained in the server apparatus 200 is displayed is described with reference to FIG. 12. It is to be noted that a client apparatus 100 in the following description is a representative of the first client apparatus 100A1, second client apparatus 100A2, different client apparatus 100B and so forth. In the following, a flow of processing is described principally in regard to the functioning blocks provided in the first client apparatus 100A1. However, it is a matter of course that processing can be carried out principally by functioning blocks provided in the second client apparatus 100A2, different client apparatus 100B, reproduction apparatus 300 or the like.

The transmission section 113 transmits an information transmission request which is a request for acquiring content relating information, which is information relating to content data retained in the server apparatus 200, to the server apparatus 200. In this instance, the client apparatus 100 further includes the reception section 114 for receiving content relating information as a response to the information transmission request from the server apparatus 200. The control section 112 can control a predetermined display section to display the content relating information received from the server apparatus 200 by the reception section 114. The control section 112 controls the transmission section 113 to transmit an information transmission request to the server apparatus 200, for example, based on a predetermined operation inputted from the user through the inputting section 115. The predetermined operation corresponds to an operation by which, for example, a Channel button 412 is selected. The display section is an example of the outputting section 116.

As seen in FIG. 12, the control section 112 can control the display section to display the content relating information received from the server apparatus 200 by the reception section 114, for example, as images 431, 432 and 433. The image 431 is an image as an example of information relating to content data selected currently, and the image 432 is an image of an example as information relating to content data selected in the last operation cycle. Further, one or a plurality of images 433 are images relating to current data from within information relating to content data which can be selected from now on such that an image 433 of the information relating to the content data conforming better to the liking of the user is arranged nearer to the image 431.

If one of the images 431, 432 and 433 is selected by the user, then the control section 112 recognizes that content data corresponding to the selected image is selected at present. The content data selected at present can be downloaded from the server apparatus 200 and reproduced by a predetermined operation such as to depress a reproduction button.

In the example shown in FIG. 12, from among a HOME button 411, a Channel button 412, a Browse button 413 and a My Library button 414, the Channel button 412 is selected. Accordingly, one or a plurality of images 433 shown in FIG. 12 are arranged such that information relating to content data conforming better to the liking of the user is arranged nearer to the image 431 within a channel selected by the user. The channel may be selected by the user referring to channel relating information 451 acquired from the server apparatus 200. Or, the channel relating information 451 may be changeable suitably depending upon a category 441.

Information relating to content data conforming better to the liking of the user may be transmitted to the client apparatus 100, for example, from the server apparatus 200. In other words, the server apparatus 200 may store liking information associated with user identification information by the storage section 111. In this instance, the server apparatus 200 can refer to the liking information to determine content data conforming better to the liking of the user in the channel selected by the user.

FIG. 12 further shows an Add to button 423, a Like button 421, a Dislike button 422 and so forth. For example, if the Add to button 423 is selected by the user, then content identification information for identifying content data selected at present can be added to the individual user registration information. If new content identification information is added to the individual user registration information, then content data identified based on the new content identification information can be downloaded to and reproduced by the client apparatus 100.

Further, for example, if the Like button 421 is selected by the user, then information relating to content data selected at present can be reflected on liking information retained in the server apparatus 200. Similarly, for example, if the Dislike button 422 is selected by the user, then information relating to content data selected at present can be reflected on the liking information retained in the server apparatus 200. The information relating to the content data selected at present may be, for example, a genre of the content data selected at present. If the liking information retained in the server apparatus 200 can be updated in this manner, then content data conforming better to the liking of the user can be proposed to the user.

Figure 13:
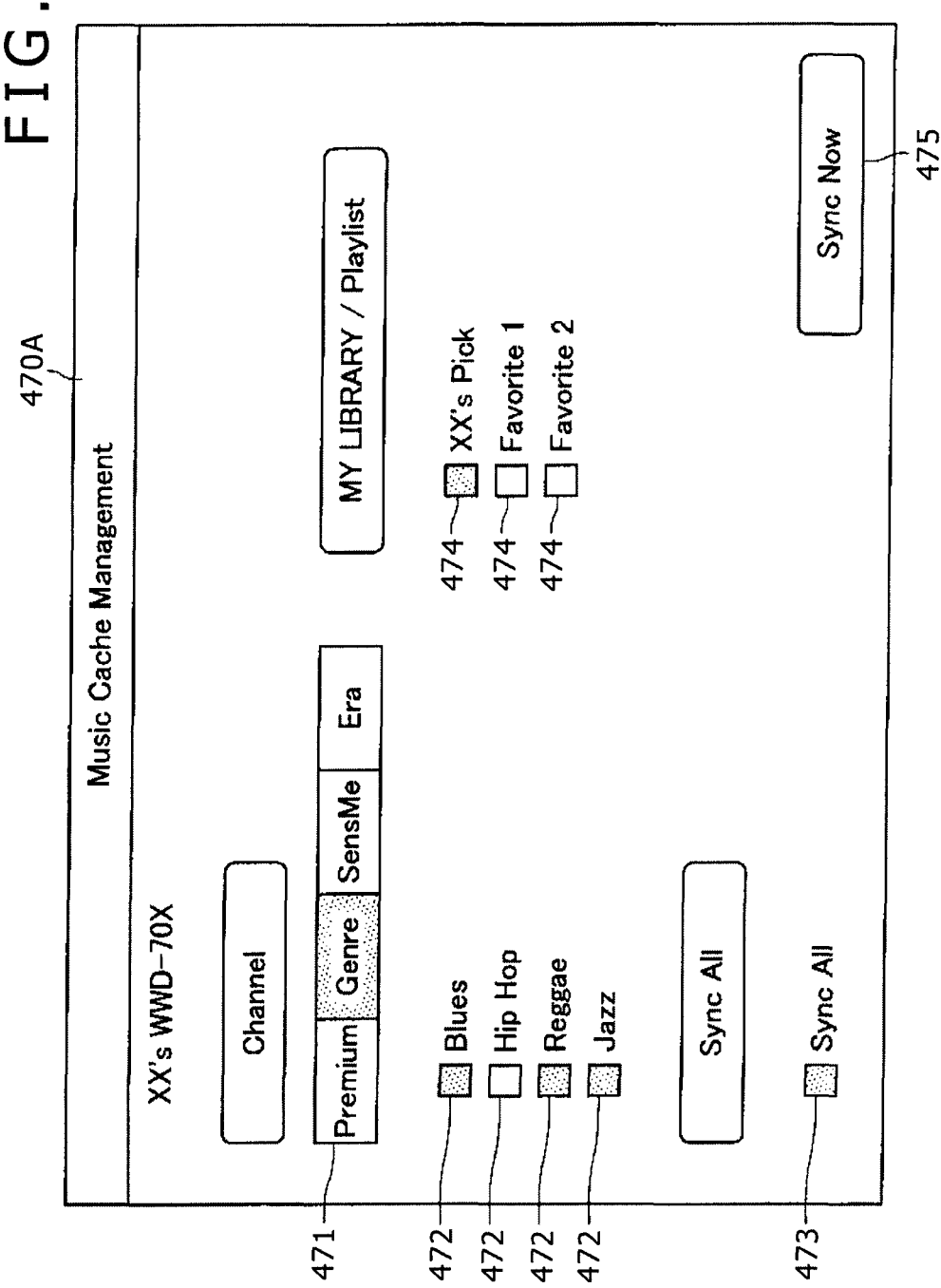
FIG. 13 is a schematic view showing an example of a screen image displayed before transfer of content data from the server apparatus to the reproduction apparatus through a client apparatus is started.

1-13. Example of a Screen Image Displayed Before Start of Content Data Transfer FIG. 13 shows an example of a screen image display before transfer of content data from the server apparatus 200 in the embodiment of the disclosed technology to the reproduction apparatus 300 through the client apparatus 100 is started. The example of screen image display before transfer of content data from the server apparatus 200 to the reproduction apparatus 300 through the client apparatus 100 is started is described with reference to FIG. 13.

It is to be noted that the screen image 470A shown in FIG. 13 is displayed in accordance with an instruction of the transfer device 400, for example, when connection between the reproduction apparatus 300 and the client apparatus 100 is confirmed by the transfer device 400. The apparatus which displays the screen image 470A may be the client apparatus 100 or the reproduction apparatus 300. For example, in the case where the client apparatus 100 displays the screen image 470A, when the transfer device 400 confirms connection between the reproduction apparatus 300 and the client apparatus 100, the Web browser 1121 may be started so that the screen image 470A is displayed by a function of the Web browser 1121.

Before transfer of content data from the server apparatus 200 to the reproduction apparatus 300 through the client apparatus 100 is started, for example, such a screen image 470A as shown in FIG. 13 is displayed. While the screen image 470A is read, the user can select content data to be transferred from the server apparatus 200 to the reproduction apparatus 300 through the client apparatus 100. For example, by placing a check mark into a channel selection field 472 and depressing a Sync Now button 475, the user can cause content data, which configure a channel corresponding to the channel selection field 472 in which the check mark is placed, to be transferred from the server apparatus 200 to the reproduction apparatus 300 through the client apparatus 100.

More particularly, for example, if the user places a check mark into the channel selection field 472 and then depresses the Sync Now button 475, then a content transmission request including channel identification information for identifying the channel corresponding to the channel selection field 472 in which the check mark is placed is transmitted to the server apparatus 200. The server apparatus 200 receives the content transmission request and successively transmits content data of a channel identified based on the channel identification information included in the content transmission request to the reproduction apparatus 300. In the case where a plurality of channels are sorted for individual types, the user can select a type by placing a check mark in a channel kind selection field 471.

Further, for example, if the user places a check mark in a playlist selection field 474 and depressing the Sync Now button 475, then it is possible to transfer a playlist itself corresponding to the playlist selection field 474 in which the check mark is placed and content data individually corresponding to content identification information of one or a plurality of contents which configure the playlist from the server apparatus 200 to the reproduction apparatus 300 through the client apparatus 100.

More particularly, for example, if the user places a check mark into the playlist selection field 474 and then depresses the Sync Now button 475, then a content transmission request including playlist identification information for identifying a playlist corresponding to the playlist selection field 474 in which the check mark is placed is transmitted to the server apparatus 200. The server apparatus 200 receives the playlist transmission request and successively transfers a playlist itself identified based on the playlist identification information included in the content transmission request and content data individually corresponding to content identification information of one or a plurality of contents which configures the playlist to the reproduction apparatus 300.

The server apparatus 200 can successively transmit the playlist itself and the content data corresponding to the content identification information of one or a plurality of contents which configures the playlist to the reproduction apparatus 300 only in the case where, for example, the playlist identified based on the playlist identification information included in the content transmission request is registered in an associated relationship with the user identification information included in the content transmission request in the individual user registration information.

Further, for example, if the user places a check mark into an Sync All field 473 and depresses the Sync Now button 475, then it can cause the content data which configured the channel, the playlist itself, and the content data corresponding to the content identification information of one or a plurality of contents which configures the playlist to be transferred from the server apparatus 200 to the reproduction apparatus 300 through the client apparatus 100. Thereupon, for example, the server apparatus 200 can control such that a playlist itself which is not registered in the individual user registration information and content data corresponding to the content identification information of one or a plurality of contents which configures the playlist are not transmitted to the reproduction apparatus 300.

Further, for example, if the user places a check mark into a content data selection field not shown and then depresses the Sync Now button 475, then content data corresponding to the content data selection field in which the check mark is placed can be transferred from the server apparatus 200 to the reproduction apparatus 300 through the client apparatus 100.

More particularly, for example, if the user places a check mark into the content data selection field not shown and then depresses the Sync Now button 475, then a content transmission request including content data identification information for identifying content data corresponding to the content data selection field in which the check mark is placed is transmitted to the server apparatus 200. The server apparatus 200 receives the content transmission request and transmits content data identified based on the content data identification information included in the content transmission request to the reproduction apparatus 300.

The server apparatus 200 can transmit content data identified, for example, based on the content data identification information included in the content transmission request, to the reproduction apparatus 300 only in the case where the content data is registered in an associated relationship with the user identification information included in the content transmission request as transmittable content information in the individual user registration information.

Although it has been described that various kinds of information is transferred from the server apparatus 200 to the reproduction apparatus 300 through the client apparatus 100 in response to depression of the Sync Now button 475 by the user, the necessity for transmission from the server apparatus 200 to the reproduction apparatus 300 is low in regard to content data retained already in the reproduction apparatus 300. Further, even if content data is retailed already in the reproduction apparatus 300, if the content data is not registered in the server apparatus 200, then the necessity to keep the content data continuously retained in the reproduction apparatus 300 may be low.

In such an instance, such control that only content data selected by the user is transferred to the reproduction apparatus 300 while content data not selected by the user is deleted from the reproduction apparatus 300 may be carried out. In the following description, such control as just described may be referred to particularly as "synchronization (or Sync)." Accordingly, the term "synchronization" in the description of the present embodiment is regarded as a form of "transfer."

1-14. Example of a Display Screen Displayed During Content Data Transfer

Figure 14:
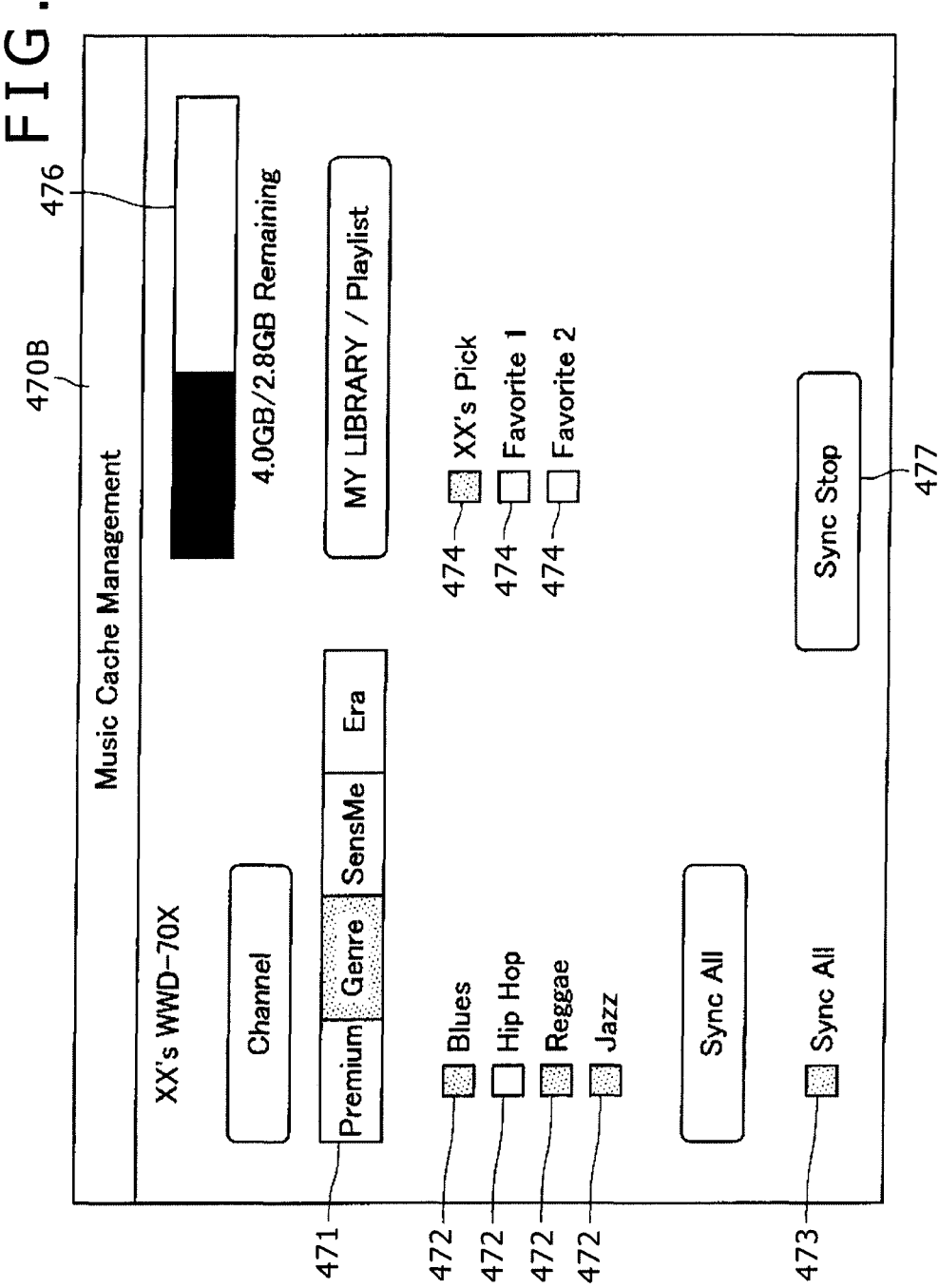
FIG. 14 is a schematic view showing an example of a screen image displayed while content data are transferred from the server apparatus to the reproduction apparatus through the client apparatus.

FIG. 14 shows an example of a screen image displayed while content data is being transferred from the server apparatus 200 in the embodiment of the disclosed technology to the reproduction apparatus 300 through a client apparatus 100. In the following, the example of a screen image displayed while content data is being transferred from the server apparatus 200 to the reproduction apparatus 300 through a client apparatus 100 is described with reference to FIG. 14. It is to be noted that the apparatus on which the screen image 470B is displayed may be, for example, a client apparatus 100 or the reproduction apparatus 300 similarly to the screen image 470A.

While content data is being transferred from the server apparatus 200 to the reproduction apparatus 300 through a client apparatus 100, for example, such a screen image 470B as shown in FIG. 14 is displayed. While the user refers to the screen image 470B, the user can confirm a state of progress regarding transfer of content data from a progress bar 476. If a Sync Stop button 477 is depressed, then the transfer of content data to the reproduction apparatus 300 can be interrupted. More particularly, if the user depresses, for example, the Sync Stop button 477, then an interrupt request representing that the transfer of content data to the reproduction apparatus 300 should be interrupted is transmitted to the server apparatus 200. The server apparatus 200 receives the interrupt request and can interrupt the transmission of content data to the reproduction apparatus 300.

Figure 15:
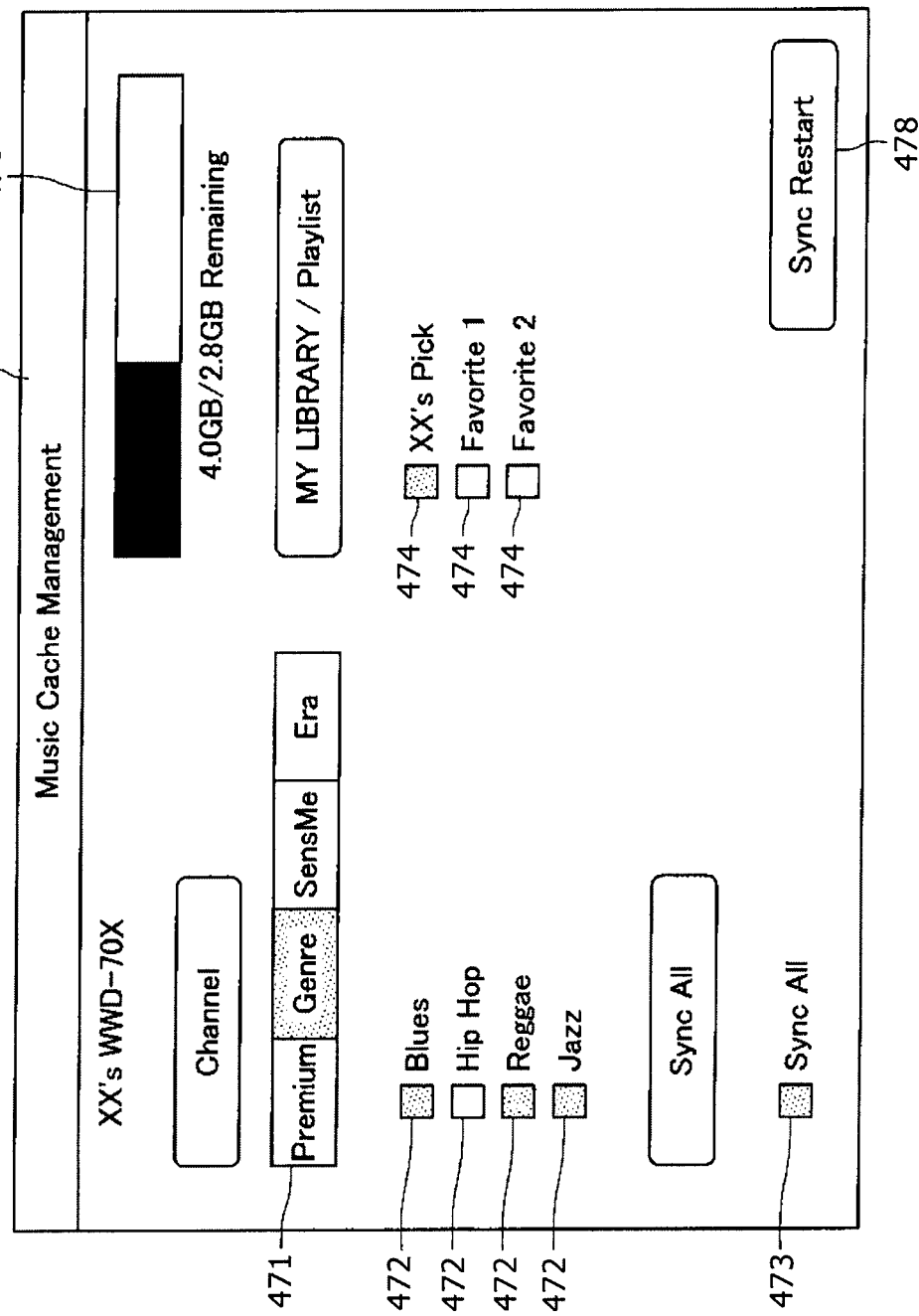
FIG. 15 is a schematic view showing an example of a screen image displayed while transfer of content data from the server apparatus to the reproduction apparatus through the client apparatus is interrupted.

1-15. Example of a Display Screen Displayed Upon Interruption of Content Data Transfer FIG. 15 shows an example of a screen image displayed while transfer of content data from the server apparatus 200 in the embodiment of the disclosed technology to the reproduction apparatus 300 through a client apparatus 100 is interrupted. The example of a screen image displayed while transfer of content data from the server apparatus 200 to the reproduction apparatus 300 through a client apparatus 100 is interrupted is described with reference to FIG. 15. It is to be noted that the apparatus which displays the screen image 470C may be, for example, a client apparatus 100 or the reproduction apparatus 300 similarly to the screen image 470A.

While transfer of content data from the server apparatus 200 to the reproduction apparatus 300 through a client apparatus 100 is interrupted, for example, such a screen image 470C as shown in FIG. 15 is displayed. While the user watches the screen image 470C, the user can confirm a state of progress regarding the transfer of content data from the progress bar 476. If a Sync Restart button 478 is depressed, then the transfer of content data to the reproduction apparatus 300 can be re-started or resumed. More particularly, if the user depresses, for example, the Sync Restart button 478, then a content transmission request to the reproduction apparatus 300 is transmitted to the server apparatus 200. The server apparatus 200 receives the content transmission request and can resume transmission of content data to the reproduction apparatus 300.

1-16. Functional Configuration of the Reproduction Apparatus

Figure 16:
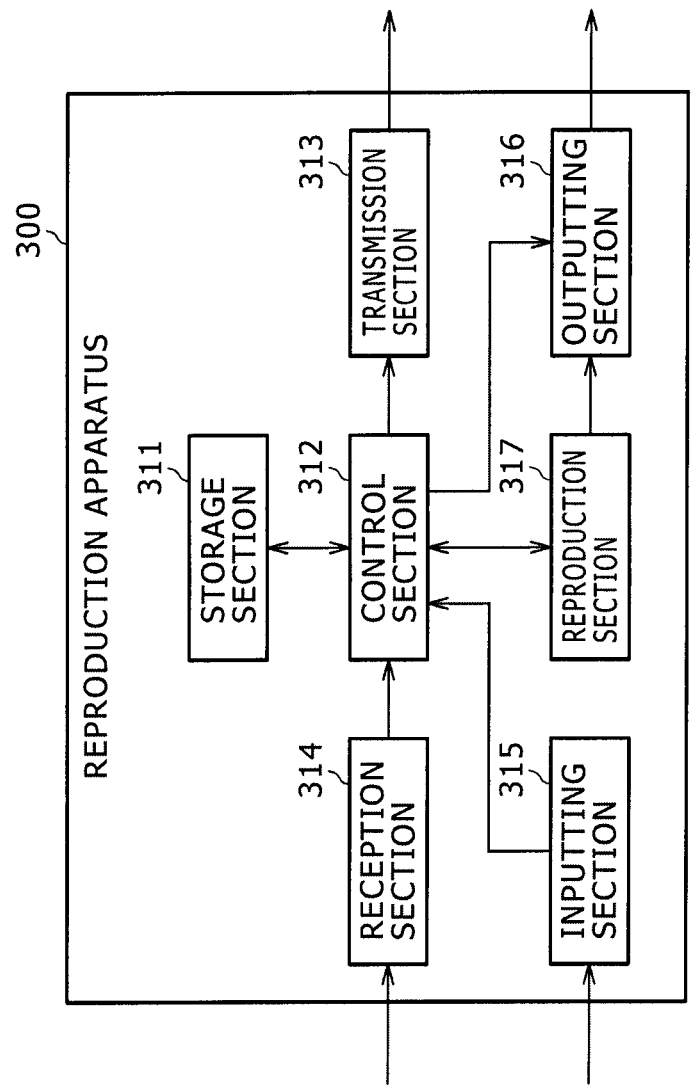
FIG. 16 is a block diagram showing a functional configuration of the reproduction apparatus.

FIG. 16 shows a functional configuration of the reproduction apparatus 300 in the embodiment of the disclosed technology. In the following, the functional configuration of the reproduction apparatus 300 is described with reference to FIG. 16.

The reproduction apparatus 300 includes, as occasion demands, a storage section 311, a control section 312, a transmission section 313, a reception section 314, an inputting section 315, an outputting section 316, a reproduction section 317 and so forth.

The storage section 311 can store content data, playlists and so forth. Content data stored in the storage section 311 can be acquired by the control section 312. Further, content data can be registered into the storage section 311 by the control section 312. The registration of content data into the storage section 311 is controlled by the control section 312, for example, based on an operation inputted from the user through the inputting section 315. The content data to be registered into the storage section 311 may be received by the reception section 314 or may be inputted through the inputting section 315. The storage section 311 is configured from a storage device such as, for example, a HDD.

The control section 312 has a function of acquiring content identification information for identifying content data stored in the storage section 311. Various methods are available for acquiring content identification data for identifying content identification information stored in the storage section 311, and the acquisition method is not limited particularly. For example, in the case where content identification information is added to content data stored in the storage section 311, the content identification information added to the content data can be acquired.

The control section 312 further has a function of controlling operation of the functioning blocks in the reproduction apparatus 300. The control section 312 is configured, for example, from a CPU, a RAM and so forth, and the CPU develops a program stored in the storage section 111 into the RAM and executes the program to implement the functions of the control section 312. However, the configuration of the control section 312 is not limited to this, but the control section 312 may be configured from hardware for exclusive use.

The transmission section 313 has a function of transmitting various kinds of information to a client apparatus 100. The transmission section 313 further has a function of transmitting a request produced by the control section 312 based on an operation inputted through the inputting section 315 to the client apparatus 100. The request is transferred, for example, from the client apparatus 100 to the server apparatus 200. The transmission section 313 is configured, for example, from a communication device.

The reception section 314 has a function of receiving various kinds of information from the client apparatus 100. The reception section 314 has a function of receiving, if a request produced by the control section 312, for example, based on an operation inputted through the inputting section 315 is transmitted by the transmission section 313, a response to the request from the server apparatus 200. Further, the reception section 314 can receive content data for being stored into the storage section 311 as described hereinabove. The reception section 314 is configured, for example, from a communication device.

The inputting section 315 has a function of accepting an operation from the user and outputting the accepted operation as an operation signal to the control section 312. The inputting section 315 is configured, for example, from an inputting device. A request is produced by the control section 312 based on an operation inputted through the inputting section 315, and the request produced by the control section 312 is transmitted to the client apparatus 100 from the transmission section 313.

The outputting section 316 has a function of outputting various kinds of information or various requests under the control of the control section 312. Further, the outputting section 316 has a function of outputting content data produced by the reproduction section 317. For example, in the case where the content data is sound data, the outputting section 316 may be configured from a sound outputting device such that sound is outputted based on the sound data from the sound outputting device. On the other hand, for example, if the content data is image data, then the outputting section 316 may be configured from a display device such that an output image is outputted based on the image data by the display device.

The reproduction section 317 can reproduce content data received from the client apparatus 100 under the control of the control section 312 as described hereinabove. For example, while the reproduction section 317 can stream reproduce the content data received from the client apparatus 100, the content data received from the client apparatus 100 may not necessarily be stream reproduced. The reproduction section 317 can reproduce content data received from the client apparatus 100 by the reception section 314 by offline reproduction.

1-17. Functional Configuration of the Transfer Device

FIG. 17 shows a functional configuration of the transfer device 400 according to the embodiment of the disclosed technology. In the following, the functional configuration of the transfer device 400 is described.

The transfer device 400 includes at least a reception section 410, a control section 420, a transmission section 430, and a storage section 460 as shown in FIG. 17. It is to be noted that the transfer device 400 may be incorporated in the server apparatus 200 or may be incorporated in the reproduction apparatus 300 as described hereinabove.

The storage section 460 has a function of storing a transmission object list including content identification information of a plurality of contents individually corresponding to a plurality of content data to be transmitted from the server apparatus 200 to the reproduction apparatus 300 connected to a client apparatus 100 through the client apparatus 100. The transmission object list stored in the storage section 460 can be acquired by the control section 420. The transmission object list can also be registered into the storage section 460 by the control section 420.

The registration of the transmission object list into the storage section 460 is controlled, for example, by the control section 420. The transmission object list to be registered into the storage section 460 may be those received, for example, by the reception section 410. The transmission object list correspond to "SyncList" hereinafter described. The storage section 460 is configured from a storage device such as, for example, a HDD.

The reception section 410 has a function of successively receiving a plurality of content data from the server apparatus 200. In the case where the transfer device 400 is incorporated in the server apparatus 200, the reception section 410 successively receives a plurality of content data in the server apparatus 200. On the other hand, if the transfer device 400 is incorporated in the reproduction apparatus 300, then the reception section 410 successively receives a plurality of content data from the server apparatus 200 through the client apparatus 100. The reception section 410 is configured, for example, from a communication device.

The transmission section 430 has a function of successively transferring a plurality of content data successively received from the reception section 410 to the reproduction apparatus 300. If the transfer device 400 is incorporated in the server apparatus 200, then the transmission section 430 successively transmits a plurality of content data to the reproduction apparatus 300 through the client apparatus 100. On the other hand, if the transfer device 400 is incorporated in the reproduction apparatus 300, then the transmission section 430 successively transmits a plurality of content data to the reproduction apparatus 300 in the reproduction apparatus 300. The transmission section 430 is configured, for example, from a communication device.

The control section 420 has a function of deleting, every time content data is transferred to the reproduction apparatus 300 by the transmission section 430, content identification information corresponding to the content data transferred by the transmission section 430 from the transmission object list stored in the storage section 460. The control section 420 further has a function of controlling operation of the functioning blocks in the transfer device 400.

The control section 420 is configured, for example, from a CPU, a RAM and so forth, and the CPU develops a program stored in the storage section 460 into the RAM and executes the program so that the functions of the control section 420 are implemented. However, the configuration of the control section 420 is not limited to this, but the control section 420 may be configured otherwise from hardware for exclusive use.

Since the transfer device 400 has such functions as described above, when a plurality of content data are successively transferred from the server apparatus 200 to the reproduction apparatus 300 through a client apparatus 100, even if the transmission is interrupted, the transfer device 400 can resume transmission of the content data from the point at which the transmission is interrupted.

1-18. Example of a Transmission Object List

FIG. 18 shows an example of a transmission object list used by the transfer device 400 in the embodiment of the disclosed technology. In the following, the example of a transmission object list used by the transfer device 400 is described with reference to FIG. 18. The transmission object list can be edited by a function of the Web application 221. The transmission object list corresponds, for example, to content data scheduled for synchronization, which is a form of transfer, with the reproduction apparatus 300 from the server apparatus 200, a playlist itself or a list regarding content data.

As described hereinabove, the transmission object list corresponds to "SyncList" illustrated in FIG. 18. As seen from FIG. 18, the "SyncList" includes, for example, "TrackGUIDs," "PlayListGUIDs," "ChannelGUIDs," "ALLSync" and so forth. The "TrackGUIDs" corresponds to content identification information, "PlayListGUIDs" corresponds to playlist identification information, and the "CHannelGUIDs" corresponds to channel identification information.

The "ALLSync" represents synchronization setting, which is a form of transfer setting, for all content data identified, for example, based on information set in MyLibrary (individual user registration information). When the "ALLSync" is "true," it represents that synchronization for all content data is to be executed, but if it is "false," it represents that synchronization for all content data is not to be executed. All content data may include not only content data identified based on "TrackGUIDs" but also a playlist itself identified based on the "PlayListGUIDs," content data identified based on content identification information which configures the playlist, content data which configure a channel identified based on the "ChannelGUIDs" and so forth.

1-19. Example of a Target List

FIG. 19 illustrates an example of a target list used by the transfer device 400 according to the embodiment of the disclosed technology. In the following, the example of a target list used by the transfer device 400 is described with reference to FIG. 19.

"TargetList" illustrated in FIG. 19 is produced by the transfer device 400 developing the "SyncList" upon starting of synchronization, which is a form of starting of transfer. More particularly, the transfer device 400 copies the substance set in the "SyncList" into the "TargetList" and adds content identification information, which configures a playlist identified based on playlist identification information set in the "PlayListGUIDs," in the example of FIG. 19, based on P1, P10, P100, P500 and so forth, to the "TrackGUIDs" of the "TargetList."

If the "TargetList" produced by the transfer device 400 developing the "SyncList" in this manner is used, then synchronism not only of the playlist itself but also of content data identified based on the content identification information which configures the playlist can be established between the server apparatus 200 and the reproduction apparatus 300. In other words, not only the playlist but also the content data can be transmitted from the server apparatus 200 to the reproduction apparatus 300.

1-20. Example of a Transmission Completion List

FIG. 20 illustrates an example of a transmission completion list used by the transfer device 400 in the embodiment of the disclosed technology. In the following, the example of a transmission completion list used by the transfer device 400 is described with reference to FIG. 20.

"CurrentList" illustrated in FIG. 20 has set therein various kinds of information such as content data, a playlist itself and so forth currently retained by the reproduction apparatus 300. The transfer device 400 can calculate the difference between the "TargetList" and the "CurrentList." For example, the transfer device 400 can delete, based on the calculated difference, for example, those content data which are identified based on content identification information which is not set in the "TargetList" but is set in the "CurrentList" from the reproduction apparatus 300.

Further, the transfer device 400 can cause the server apparatus 200 or Web application 221 to transmit content data which are not set in the "CurrentList" but are set in the "TargetList" to the reproduction apparatus 300. Further, the transfer device 400 can restrict those content data which are set in both of the "CurrentList" and the "TargetList" from being transmitted from the server apparatus 200 or Web application 221 to the reproduction apparatus 300 again.

1-21. Process Executed Upon Connection of the Transfer Device

Figure 21:
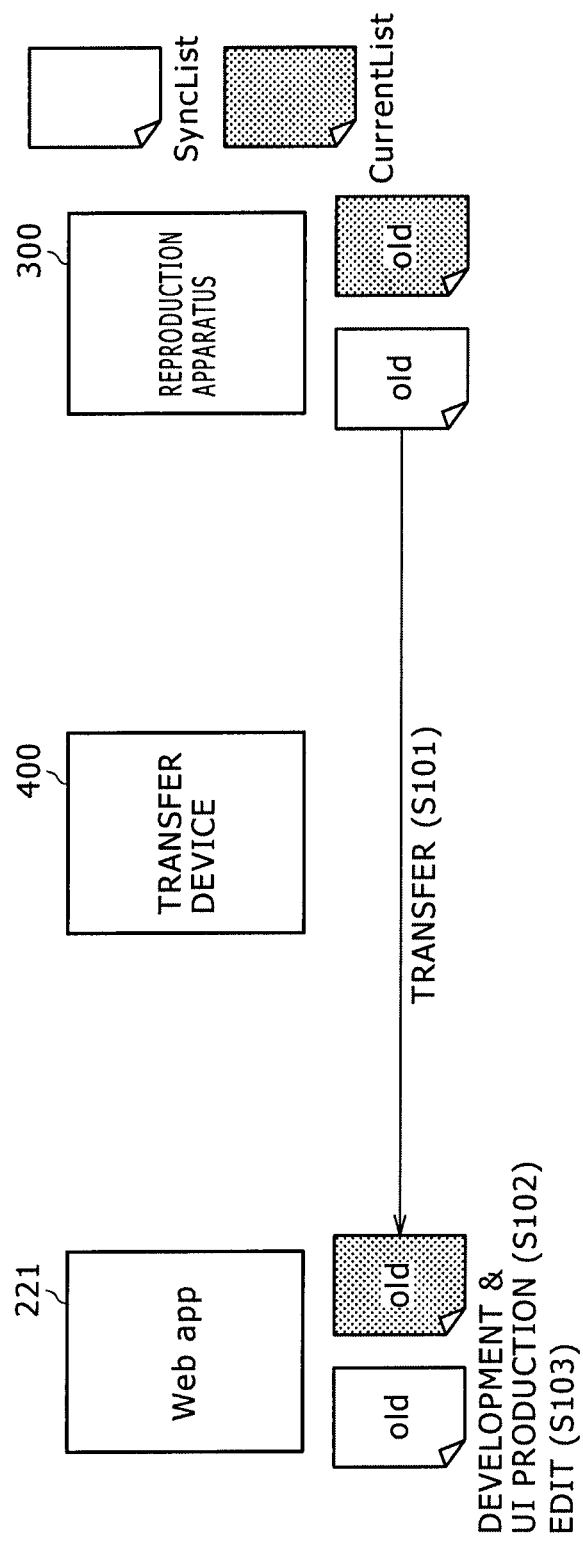
FIG. 21 is a diagrammatic view illustrating a flow of processing executed when the reproduction apparatus is connected to the transfer device.

FIG. 21 illustrates a flow of processing executed when the reproduction apparatus 300 in the embodiment of the disclosed technology is connected to the transfer device 400. In the following, the flow of processing executed when the reproduction apparatus 300 is connected to the transfer device 400 is described with reference to FIG. 21.

If the client apparatus 100 starts up the Web application 221 and the Web application 221 issues an inquiry about a connection situation between the reproduction apparatus 300 and a client apparatus 100, then the transfer device 400 starts up the Web browser 1121. Consequently, the Web application 221 dynamically changes the UI to be provided to the Web browser 1121 together with the progress of synchronization or transfer of content data, and consequently, the Web browser 1121 can provide the dynamically changing UI. The UI provided to the Web browser 1121 is displayed, for example, as the screen image 470B shown in FIG. 14, and the dynamic change of the UI is represented, for example, as a variation of the progress bar 476.

The reception section 410 of the transfer device 400 receives the "CurrentList" and the "SyncList" from the reproduction apparatus 300, and the transmission section 430 transmits the "CurrentList" and the "SyncList" received from the reproduction apparatus 300 to the Web application 221. The Web application 221 produces a UI based on the received "CurrentList" and "SyncList" and provides the UI to the Web browser 1121. The Web browser 1121 displays the UI so that the user can grasp the content data scheduled to be synchronized or transferred and the content data transmitted already.

1-22. Process Executed Upon Editing of a Transmission Object List

Figure 22:
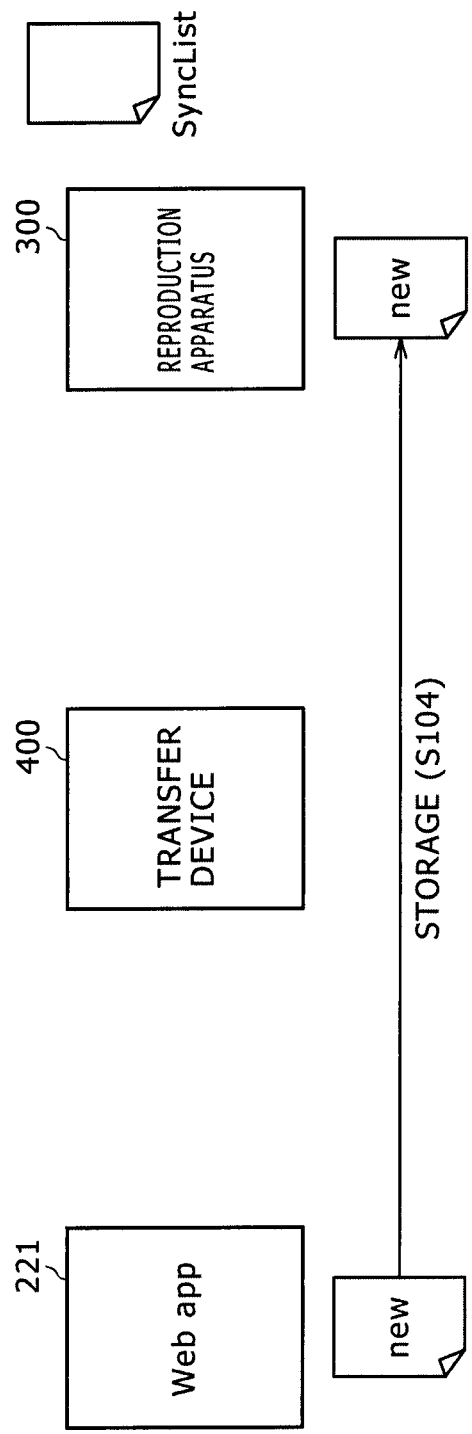
FIG. 22 is a diagrammatic view illustrating a flow of processing executed while a transmission object list is being edited by the server apparatus.

FIG. 22 illustrates a flow of processing executed while a transmission object list is edited by the server apparatus 200 in the embodiment of the disclosed technology. In the following, the flow of processing executed while a transmission object list is edited by the server apparatus 200 is described with reference to FIG. 22. It is to be noted that the "SyncList" is used here as the transmission object list.

The user can edit the "SyncList" on a UI provided by the Web application 221 as seen in FIG. 22. More particularly, the user can add or delete the substance of the "TrackGUIDs," "PlayListGUIDs" and "ChannelGUIDs" set in the "SyncList" on the UI provided by the Web application 221. The "SyncList" produced by the Web application 221 can be stored into the reproduction apparatus 300. The "SyncList" can be stored, for example, periodically into the reproduction apparatus 300.

At this time, the reception section 410 of the transfer device 400 is enabled to receive the "SyncList" during editing on the server apparatus 200 from the server apparatus 200. As a process executed by the transfer device 400, when the "SyncList" during editing is received by the reception section 410, the transmission section 430 transmits the "SyncList" during editing received by the reception section 410 to the reproduction apparatus 300. For example, the transmission section 430 can store the "SyncList" during editing periodically into the reproduction apparatus 300. Consequently, latest content data scheduled for synchronization or transfer can be grasped. Even if the "SyncList" disappears from the server apparatus 200 upon updating of the Web application 221, the "SyncList" stored in the reproduction apparatus 300 can be used.

1-23. Process Executed Upon Reception of a Starting Request (Part 1)

Figure 23:
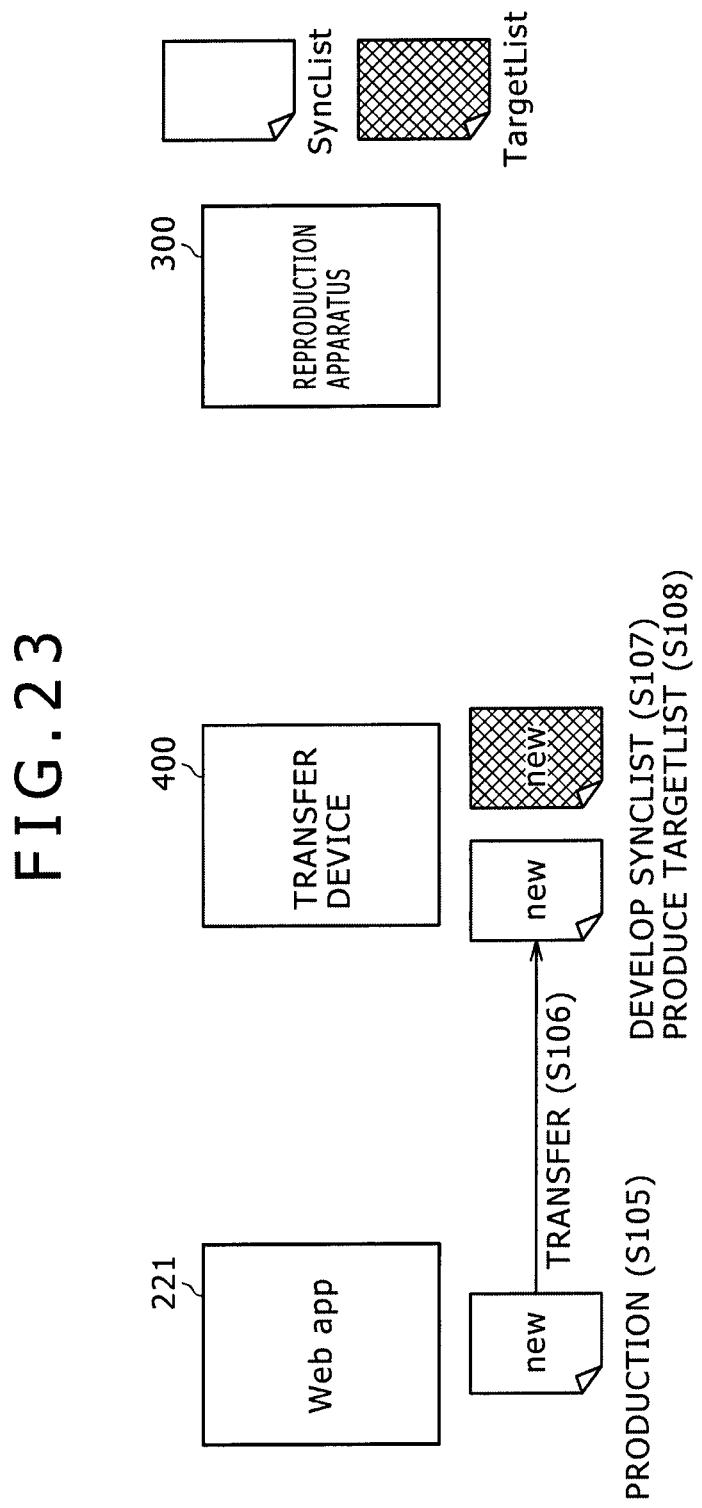
FIG. 23 is a diagrammatic view illustrating a flow of processing (part 1) executed when a request to start transfer of a plurality of content data is received.

FIG. 23 illustrates a flow of processing (part 1) which is executed when a request to start transfer of a plurality of content data is received. In the following, the flow of processing (part 1) which is executed when a request to start transfer of a plurality of content data is received is described.

As shown in FIG. 23, after the transfer device 400 receives a request to start transfer of content data, it receives the SyncList" after editing from the Web application 221 and can store the received "SyncList." The transfer device 400 can produce "TargetList" by developing the stored "SyncList." The request to start transfer of content data is received, for example, as a result of selection of the Sync Now button 475 of the screen image 470A by the user.

At this time, if playlist identification information for identifying a playlist is included in the "SyncList" received by the reception section 410, then the control section 420 of the transfer device 400 can acquire content identification information of a plurality of contents which configures a playlist identified based on the playlist identification information. The content identification information of a plurality of contents which configures the playlist identified based on the playlist identification information is added to "SyncList" so as to produce "TargetList." The control section 420 can include the acquired content identification information of a plurality of contents into a content transmission request. Consequently, it is possible to cause the server apparatus 200 to transmit not only the playlist itself but also content data corresponding to the content identification information of a plurality of contents which configure the playlist to the reproduction apparatus 300.

1-24. Process Executed Upon Reception of a Starting Request (Part 2)

Figure 24:
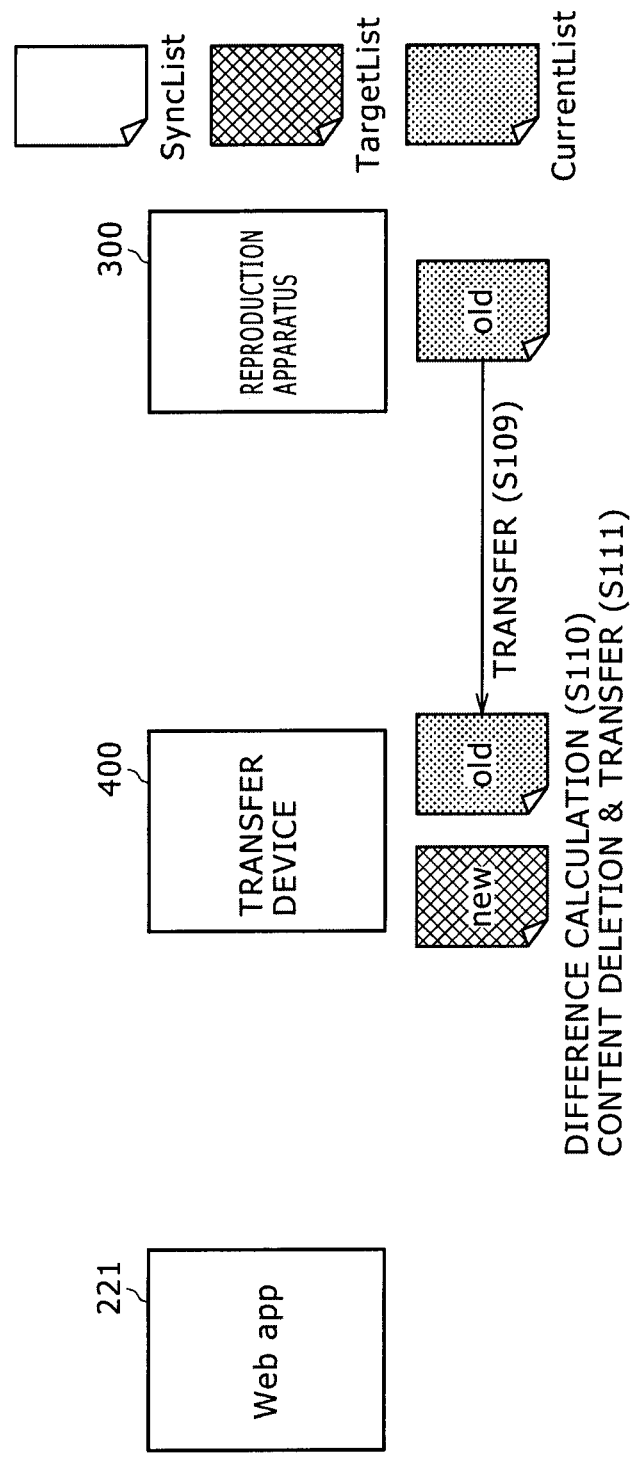
FIG. 24 is a diagrammatic view illustrating a flow of processing (part 2) executed when a request to start transfer of a plurality of content data is received.

FIG. 24 illustrates a flow of processing (part 2) executed when a request to start transfer of a plurality of content data is received. In the following, the flow of processing (part 2) executed when a request to start transfer of a plurality of content data is received is described.

If a request to start transfer of content data is received, then the transfer device 400 can receive "CurrentList" including content identification information of one or a plurality of contents individually corresponding to one or a plurality of content data retained in the reproduction apparatus 300 from the reproduction apparatus 300 as seen in FIG. 24. The "CurrentList" corresponds to a transmission completion list. The transfer device 400 calculates the difference between the produced "TargetList" and the received "CurrentList" and can cause the reproduction apparatus 300 to delete those content data which are included in the "TargetList" but are not included in the "CurrentList" from the reproduction apparatus 300. Further, the transfer device 400 can cause the content data to be transferred from the reproduction apparatus 300.

At this time, the reception section 410 of the transfer device 400 can receive a starting request indicating that transfer of a plurality of content data to the reproduction apparatus 300 should be started. If the starting request is received by the reception section 410, then the control section 420 can acquire the "CurrentList" including content identification information of one or a plurality of contents individually corresponding to the one or plural content data retained in the reproduction apparatus 300.

The control section 420 detects, for example, the content identification information which is included in the "CurrentList" but is not included in the "TargetList" and causes content data identified based on the detected content identification information to be deleted from the reproduction apparatus 300. Further, also it is possible for the control section 420 to cause content data to be transferred from the reproduction apparatus 300. After content data is deleted from the reproduction apparatus 300 by the control section 420, the transmission section 430 can transmit a content transmission request to the server apparatus 200.

1-25. Process Executed Upon Execution of Transfer

Figure 25:
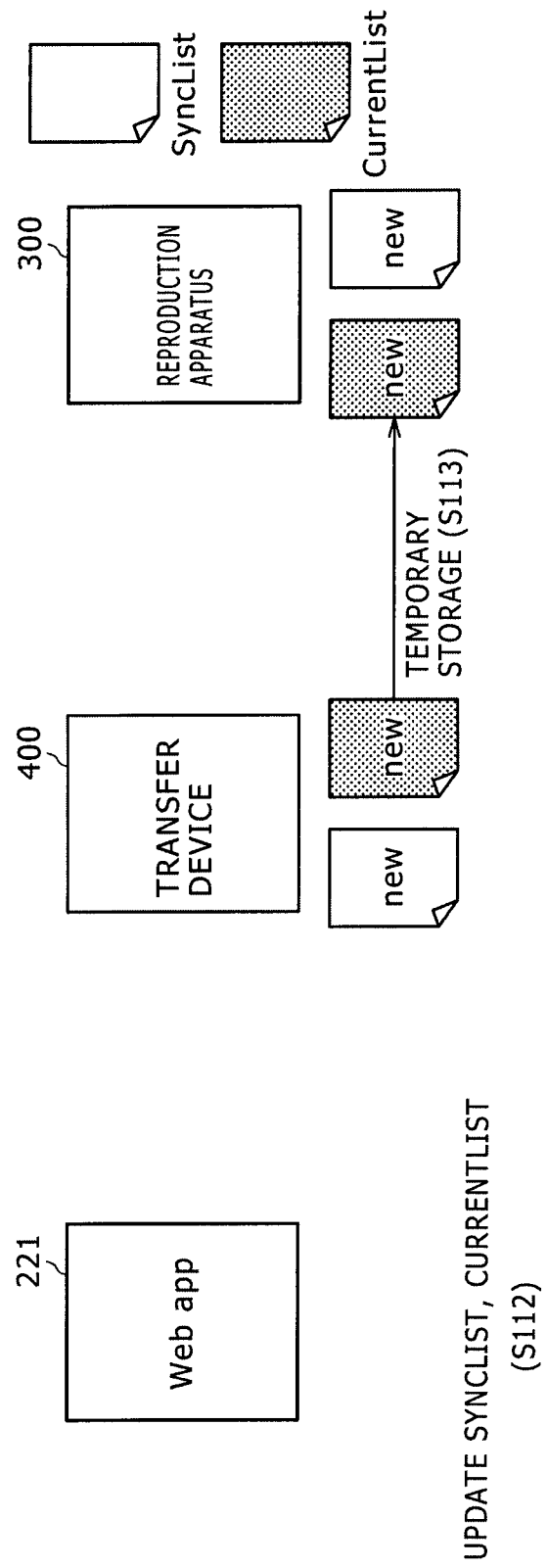
FIG. 25 is a diagrammatic view illustrating a flow of processing which is executed while transfer of a plurality of content data is executed.

FIG. 25 illustrates a flow of processing executed while transfer of a plurality of content data is executed. In the following, the flow of processing executed while transfer of a plurality of content data is executed is described with reference to FIG. 25.

A plurality of content data are successively transmitted from the server apparatus 200 in accordance with a content transmission request transmitted from the transfer device 400 to the server apparatus 200. In particular, the control section 420 of the transfer device 400 acquires content identification information of a plurality of contents from the "SyncList" stored in the storage section 460 and produces a content transmission request including the content identification information of the plural contents.

The transmission section 430 transmits the content transmission request produced by the control section 420 to the server apparatus 200, and the reception section 410 successively receives a plurality of content data as a response to the content transmission request from the server apparatus 200. The transmission section 430 successively transfers the plural content data received successively by the reception section 410 to the reproduction apparatus 300.

While the plural content data are successively transmitted from the server apparatus 200 to the reproduction apparatus 300, every time content data is transmitted to the reproduction apparatus 300 by the transmission section 430, the control section 420 can delete content identification information corresponding to the content data transferred by the transmission section 430 from the "SyncList" stored in the storage section 460. Further, the control section 420 can add, every time content data is transferred to the reproduction apparatus 300 by the transmission section 430, content identification information corresponding to the content data transferred by the transmission section 430 to the "CurrentList."

Also it is possible for the transmission section 430 to transmit the "SyncList" or the "CurrentList" to the reproduction apparatus 300 so that the "SyncList" or the "CurrentList" is stored into the reproduction apparatus 300. This is intended to allow the reproduction apparatus 300 to grasp the latest state of the "SyncList" or the "CurrentList." Consequently, after transfer of content data is interrupted, transfer of the content data can be resumed from the latest state using the "SyncList" or the "CurrentList" stored in the reproduction apparatus 300.

1-26. Process Executed Upon Completion of Transfer

Figure 26:
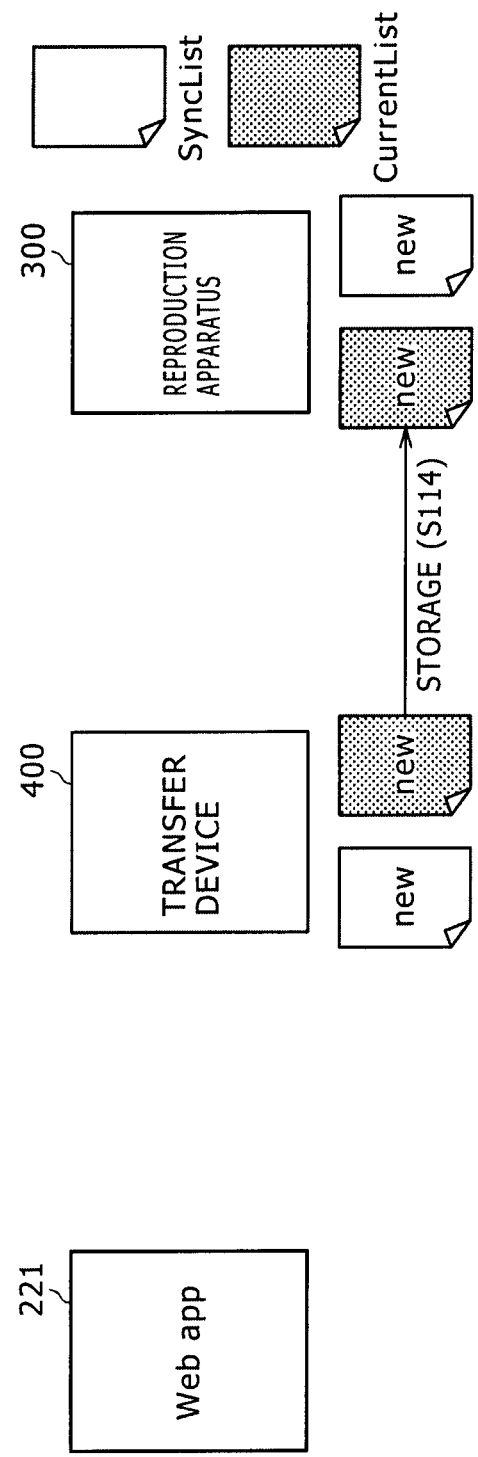
FIG. 26 is a diagrammatic view illustrating a flow of processing which is executed when transfer of a plurality of content data is completed.

FIG. 26 illustrates a flow of processing executed when transfer of a plurality of content data is completed. In the following, the flow of processing executed when transfer of a plurality of content data is completed is described with reference to FIG. 26.

When transfer of content data identified based on content identification information set in the "SyncList" is completed, the transfer device 400 can transmit the "SyncList" or the "CurrentList" upon completion of content data transfer to the reproduction apparatus 300. The reproduction apparatus 300 can store the "SyncList" or the "CurrentList" transmitted thereto from the transfer device 400.

1-27. Process Executed Upon Re-Starting of Transfer (Part 1)

Figure 27:
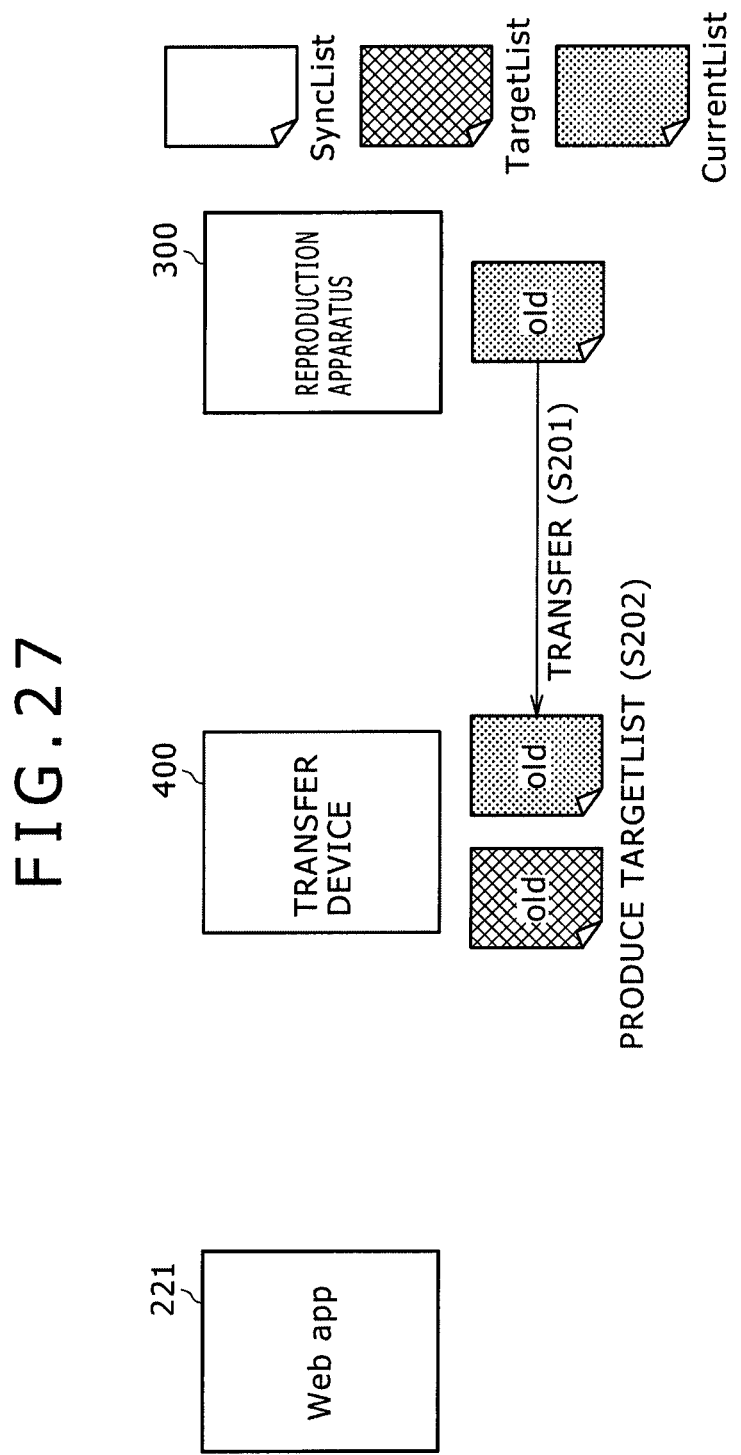
FIG. 27 is a diagrammatic view illustrating a flow of processing (part 1) which is executed when a request to resume transfer of a plurality of content data is received.

FIG. 27 illustrates a flow of processing (part 1) executed when a request to resume transfer of a plurality of content data is received. In the following, the flow of processing (part 1) executed when a request to resume transfer of a plurality of content data is received is described with reference to FIG. 27.

The transfer device 400 can resume transfer of a plurality of content data if it uses, for example, the "SyncList." At this time, the reception section 410 of the transfer device 400 can receive a resumption request indicating that transfer of a plurality of content data to the reproduction apparatus 300 should be resumed after transfer of a plurality of content data to the reproduction apparatus 300 is interrupted. The resumption request indicating that transfer of content data is to be resumed is received, for example, as a result of selection of the Sync Restart button 478 of the screen image 470C by the user.

If a resumption request is received by the reception section 410, then the control section 420 acquires content identification information of one or a plurality of contents included in the "SyncList" after content identification information is deleted and produces a content transmission request including the acquired content identification information of one or a plurality of contents. The transmission section 430 transmits the content transmission request produced by the control section 420 to the server apparatus 200. The reception section 410 successively receives one or a plurality of content data individually corresponding to the content identification information of the one or plural contents included in the "SyncList" after deletion of the content identification information by the control section 420 as a response to the content transmission request. The transmission section 430 successively transfers the one or plural content data successively received by the reception section 410 to the reproduction apparatus 300.

The transfer device 400 may use the "SyncList" stored in any apparatus in order to resume the content data transfer. For example, the transfer device 400 can use the "SyncList" retained by the transfer device 400 itself. At this time, the control section 420 may acquire, when a resumption request is received by the reception section 410, content identification information of one or a plurality of contents included in the "SyncList" after deletion of the content identification information from the storage section 460, and then produce a content transmission request including the acquired content identification information of one or a plurality of contents. Thereafter, the transmission section 430 may transmit the content transmission request produced by the control section 420 to the server apparatus 200.

For example, the transfer device 400 uses the "ScanList" stored in the reproduction apparatus 300. At this time, the control section 420 stores the "SyncList" after deletion of the content identification information into the reproduction apparatus 300. If a resumption request is received by the reception section 410, then the control section 420 may acquire content identification information of one or a plurality of contents included in the "SyncList" after the deletion of the content identification information and produce a content transmission request including the acquired content identification information of one or a plurality of contents. Thereafter, the transmission section 430 may transmit the content transmission request produced by the control section 420 to the server apparatus 200.

Also it is possible for the transfer device 400, for example, to use the "SyncList" stored in the server apparatus 200. At this time, the control section 420 stores the "SyncList" after the deletion of the content identification information into the server apparatus 200. If a resumption request is received by the reception section 410, then the control section 420 may acquire content identification information of one or a plurality of contents included in the "SyncList" after the deletion of the content identification information and produce a content transmission request including the acquired content identification information of one or a plurality of contents. Thereafter, the transmission section 430 may transmit the content transmission request produced by the control section 420 to the server apparatus 200.

Similarly as upon starting of transfer of a plurality of content data (refer to FIG. 23), the transfer device 400 can produce "TargetList" by developing the received "SyncList." By using the "TargetList," the transfer device 400 can cause not only a playlist itself but also content data individually corresponding to the content identification information of a plurality of contents which configure the playlist to be transmitted from the server apparatus 200 to the reproduction apparatus 300.

1-28. Process Executed Upon Re-Starting of Transfer (Part 2)

Figure 28:
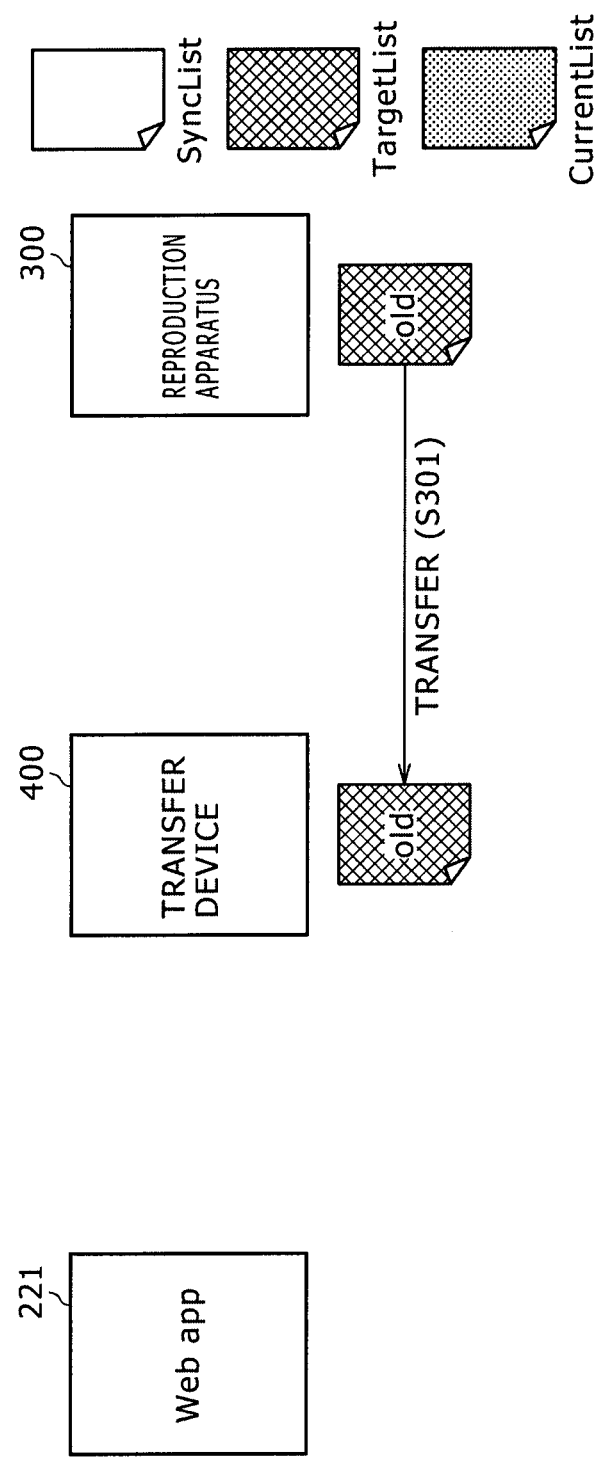
FIG. 28 is a diagrammatic view illustrating a flow of processing (part 2) which is executed when a request to resume transfer of a plurality of content data is received.

FIG. 28 illustrates a flow of processing (part 2) executed when a request to resume transfer of a plurality of content data is received. In the following, the flow of processing (part 2) executed when a request to resume transfer of a plurality of content data is received is described with reference to FIG. 28.

As seen in FIG. 28, the transfer device 400 can receive the "TargetList" stored in a different apparatus and use the received "TargetList." This makes it possible for the transfer device 400 to transmit not only a playlist itself but also content data individually corresponding to content identification information of a plurality of contents which configures the playlist from the server apparatus 200 to the reproduction apparatus 300.

1-29. Example of the Hardware Configuration of the Server Apparatus

Figure 29:
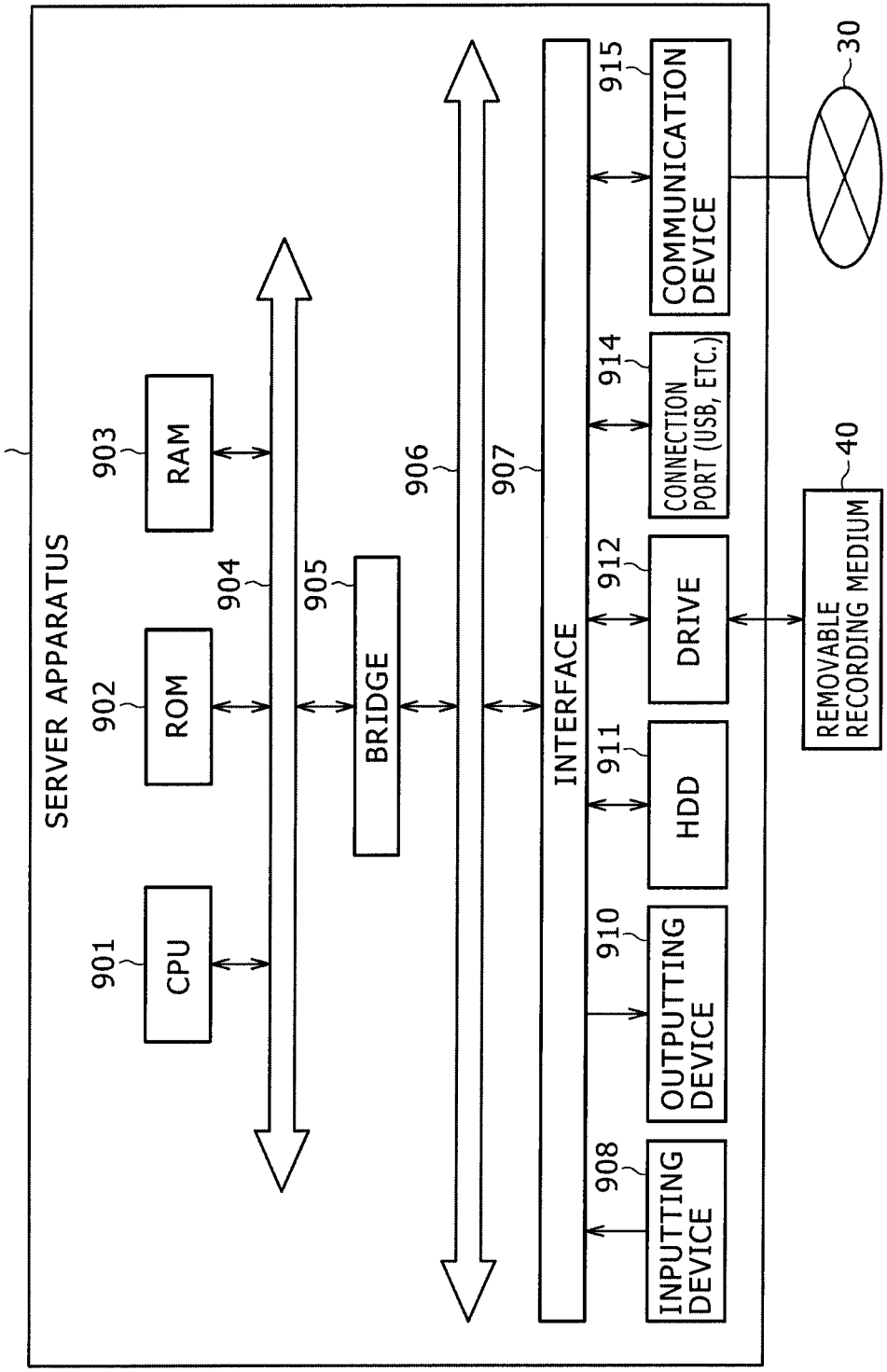
FIG. 29 is a block diagram showing an example of a hardware configuration of the server apparatus.

FIG. 29 shows an example of a hardware configuration of the server apparatus 200 according to the embodiment of the disclosed technology. In the following, the example of a hardware configuration of the server apparatus 200 is described with reference to FIG. 29.

As shown in FIG. 29, the server apparatus 200 includes, for example, a CPU (Central Processing Unit) 901, a ROM (Read Only Memory) 902, a RAM (Random Access Memory) 903, a host bus 904, and a bridge 905. The server apparatus 200 further includes an external bus 906, an interface 907, an inputting device 908, an outputting device 910, a storage device 911 in the form of a HDD, a drive 912, a connection port 914, and a communication device 915.

The CPU 901 functions as an arithmetic operation processing device and a control device, and operates in accordance with various programs stored in the ROM 902 or the HDD 911 to control the components of the server apparatus 200. As particular processes, for example, coding and decoding processes of content data, inputting and outputting processing control of content data and so forth are executed.

The ROM 902 stores programs to be used by the CPU 901, arithmetic operation parameters and so forth. Further, the ROM 902 may have a function of storing content data and so forth. The RAM 903 temporarily stores programs to be used in execution by the CPU 901, parameters which suitably change in the execution and so forth. The CPU 901, ROM 902 and RAM 903 are connected to each other by the host bus 904 configured from a CPU bus or the like.

The host bus 904 is connected to the external bus 906 such as a PCI (Peripheral Component Interconnect/Interface) bus through the bridge 905.

The inputting device 908 is configured from an operation section of a mouse, a keyboard, a touch panel, buttons, switches, levers or the like, an input controlling circuit for producing an input signal and outputting the input signal to the CPU 901, and so forth. A user of the server apparatus 200 can input various data or issue an instruction for a processing operation to the server apparatus 200 by operating the inputting device 908.

The outputting device 910 is configured from a display device such as, for example, a CRT (Cathode Ray Tube) display device, a liquid crystal display (LCD) device or lamps, and a sound outputting device such as a speaker. The outputting device 910 outputs, for example, reproduced content data. In particular, the display device displays a reproduced video content as a dynamic picture or a still picture in the form of a text or an image. Meanwhile, the sound outputting device generates sound of a reproduced audio content.

The HDD 911 is a device for data storage configured as an example of a storage section of the server apparatus 200 in the embodiment of the disclosed technology. The HDD 911 stores programs to be executed by the CPU 901 and various data on a hard disk. Further, various data such as, for example, content data are stored into the HDD 911.

The drive 912 is a reader/writer for a storage medium and is built in or externally connected to the server apparatus 200. The drive 912 records/reproduces various data such as content data on/from a removable recording medium 40 such as a magnetic disk such as a HD, an optical disk such as a CD or a DVD, a magneto-optical disk such as an MO or a semiconductor memory loaded in the server apparatus 200.

In particular, the drive 912 reads out data recorded on the removable recording medium 40 and stores the data into the RAM 903 connected thereto through the interface 907, external bus 906, bridge 905 and host bus 904. The CPU 901 stores the data into the ROM 902, HDD 911 or the like as occasion demands. Meanwhile, the drive 912 receives data stored in the ROM 902, HDD 911 or the like, newly produced data or data acquired from an external apparatus from the CPU 901 and writes the received data into the removable recording medium 40.

The connection port 914 is a port for connecting, for example, the server apparatus 200 and an external peripheral instrument to each other and has a connection terminal of the USB, IEEE1394 or the like. The connection port 914 is connected to the CPU 901 and so forth through the interface 907 and the external bus 906, bridge 905, host bus 904 and so forth.

The communication device 915 is a communication interface configured, for example, from a communication device for connecting to the network 30 or the like. The communication device 915 transfers various data such as content data and control signals to and from an external apparatus such as a client apparatus 100 through the network 30.

1-30. Example of the Hardware Configuration of the Client Apparatus

Figure 30:
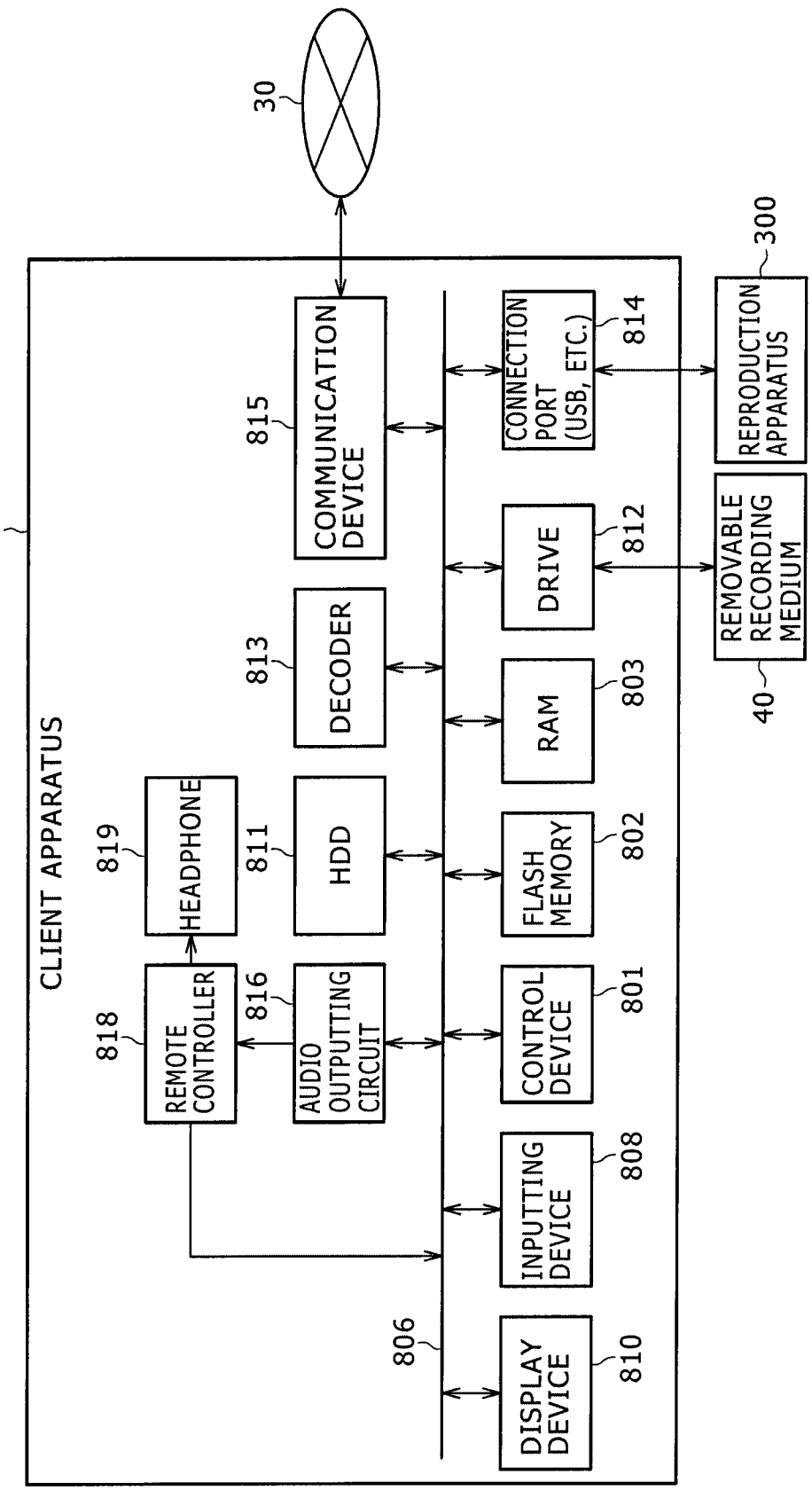
FIG. 30 is a block diagram showing an example of a hardware configuration of the client apparatus.

FIG. 30 shows an example of a hardware configuration of each client apparatus 100 according to the embodiment of the disclosed technology. In the following, the example of a hardware configuration of a client apparatus 100 is described with reference to FIG. 30.

As shown in FIG. 30, the client apparatus 100 includes, for example, a control device 801, a flash memory 802, a RAM 803, a bus 806, an inputting device 808, a display device 810, a HDD 811, a drive 812, a decoder 813, a connection port 814, a communication device 815, an audio outputting circuit 816, a remote controller 818, and a headphone 819.

The control device 801 operates in accordance with various programs stored, for example, in the flash memory 802 or the HDD 811 and controls the components of the client apparatus 100. The flash memory 802 stores, for example, programs which define operation of the control device 801 and various data. The flash memory 802 can have a function for storing content data and so forth. The RAM 803 is configured, for example, from an SDRAM (Synchronous DRAM) and temporarily stores various data relating to processing of the control device 801.

The bus 806 is a data line for connecting to the control device 801, flash memory 802, RAM 803, inputting device 808, display device 810, HDD 811, drive 812, decoder 813, communication device 815, audio outputting circuit 816 and so forth.

The inputting device 808 and the remote controller 818 are configured from an operation section such as, for example, a touch panel, button keys, levers, dials and so forth, and an inputting controlling circuit for producing an input signal in response to an operation for the operation section by the user and outputting the input signal to the control device 801. The user of the client apparatus 100 can input various data or issue an instruction for a processing operation to the client apparatus 100 by operating the inputting device 808 or the remote controller 818 hereinafter described.

The display device 810 is configured, for example, from an LCD panel, an LCD controlling circuit and so forth. The display device 810 displays various kinds of information in the form of a text or an image under the control of the control device 801.

The HDD 811 is a device for data storage configured as an example of a storage section of the client apparatus 100 according to the embodiment of the disclosed technology. The HDD 811 is configured from a hard disk drive (HDD) having a storage capacity of, for example, several tens GB and stores content data and programs and various data of the control device 801. The client apparatus 100 including such a HDD 811 as just described is configured as a content recording and reproduction apparatus which can record and reproduce content data. Consequently, it is possible to store not only content data provided through the removable recording medium 40 but also content data received from the server apparatus 200 or the like on the HDD 811 and reproduce the stored content data. However, the client apparatus 100 is not limited to this example, but may be configured as an apparatus only for reproduction of content data without including the HDD 811. In this instance, the client apparatus 100 can read out, for example, content data stored in the removable recording medium 40 and can execute only reproduction of the content data but cannot carry out recording. Further, the client apparatus 100 may carry out streaming reproduction in which it successively reproduces content data received from the server apparatus 200 or the like without storing the content data into the HDD 811.

The drive 812 is a reader/writer for a storage medium and is built in the client apparatus 100. The drive 812 records/reproduces various data such as content data on/from a removable recording medium 40 loaded in the client apparatus 100. The decoder 813 carries out a decoding process, a surround process, a conversion process into PCM (pulse code modulation) data and so forth for coded content data.

The connection port 814 is a port for connecting an external peripheral apparatus such as the reproduction apparatus 300 and has a connection terminal of the USB, IEEE1394 or the like. The connection port 814 is connected to the control device 801 and so forth through the bus 806. The connection port 814 makes it possible for the client apparatus 100 to communicate various data with the reproduction apparatus 300.

The communication device 815 transfers various data such as content data, for example, to and from the server apparatus 200 connected thereto through the network 30. The communication device 815 may further have, for example, a function of transmitting a request to the server apparatus 200 through the network 30 and receiving a response to the request from the server apparatus 200 through the network 30.

The audio outputting circuit 816 amplifies analog sound data decoded by the decoder 813 and DA (digital to analog) converted by the control device 801 and outputs the amplified analog sound data to the remote controller 818. The analog sound data is outputted from the remote controller 818 to the headphone 819 such that sound is outputted from a speaker not shown built in the headphone 819.

1-31. Example of the Hardware Configuration of the Reproduction Apparatus

Figure 31:
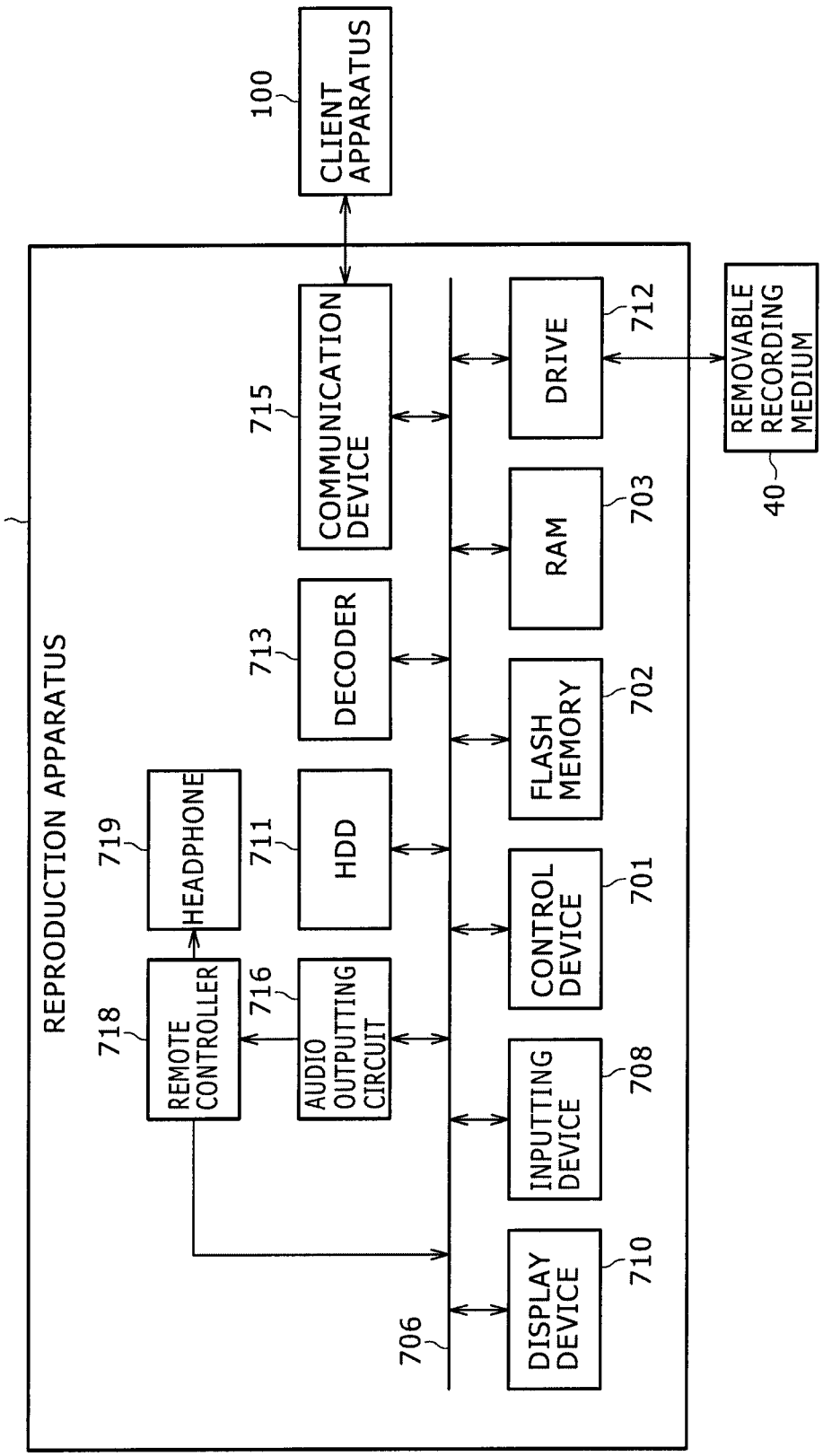
FIG. 31 is a block diagram showing an example of a hardware configuration of the reproduction apparatus.

FIG. 31 shows an example of a hardware configuration of the reproduction apparatus 300 according to the embodiment of the disclosed technology. In the following, the example of a hardware configuration of the reproduction apparatus 300 is described with reference to FIG. 31.

The reproduction apparatus 300 includes, for example, a control device 701, a flash memory 702, a RAM 703, a bus 706, an inputting device 708, a display device 710, a HDD 711, a drive 712, a decoder 713, a communication device 715, an audio outputting circuit 716, a remote controller 718, and a headphone 719.

The control device 701 operates in accordance with various programs stored, for example, in the flash memory 702 or the HDD 711 and controls the components of the reproduction apparatus 300. The flash memory 702 stores, for example, programs which define operation of the control device 701 and various data. The flash memory 702 may have a function for storing content data and so forth. The RAM 703 is configured, for example, from an SDRAM (Synchronous DRAM) and temporarily stores various data relating to processing of the control device 701.

The bus 706 is a data line which connects the control device 701, the flash memory 702, RAM 703, inputting device 708, display device 710, HDD 711, drive 712, decoder 713, communication device 715, audio outputting circuit 716 and so forth to each other.

The inputting device 708 and the remote controller 718 are each configured from an operation section such as, for example, a touch panel, button keys, levers, dials and so forth, an inputting controlling circuit which produces an input signal in response to an operation for the operation section by a user and outputting the input signal to the control device 701, and so forth. The user of the reproduction apparatus 300 can input various data or issue an instruction for a processing operation to the reproduction apparatus 300 by operating the inputting device 708 or the remote controller 718 hereinafter described.

The display device 710 is configured, for example, from an LCD panel, an LCD controlling circuit and so forth. The display device 710 displays various kinds of information in the form of a text or an image under the control of the control device 701.

The HDD 711 is a device for data storage configured as an example of a storage section of the reproduction apparatus 300 according to the embodiment of the disclosed technique. The HDD 711 is configured from a hard disk drive (HDD) having a storage capacity of, for example, several tens GB and stores content data and programs and various data of the control device 701. The reproduction apparatus 300 including such a HDD 711 as just described is configured as a content recording and reproduction apparatus which can record and reproduce content data. Consequently, it is possible to store not only content data provided through the removable recording medium 40 but also content data received from the server apparatus 200 or the like on the HDD 711 and reproduce the stored content data. However, the reproduction apparatus 300 is not limited to this example, but may be configured as an apparatus only for reproduction of content data without including the HDD 711. In this instance, the reproduction apparatus 300 can read out, for example, content data stored in the removable recording medium 40 and can execute only reproduction of the content data but cannot carry out recording. Further, the reproduction apparatus 300 may carry out streaming reproduction in which it successively reproduces content data received from the server apparatus 200 or the like without storing the content data into the HDD 711.

The drive 712 is a reader/writer for a storage medium and is built in the reproduction apparatus 300. The drive 712 records/reproduces various data such as content data on/from a removable recording medium 40 loaded in the reproduction apparatus 300. The decoder 713 carries out a decoding process, a surround process, a conversion process into PCM data and so forth for coded content data.

The communication device 715 transfers various data such as content data, for example, to and from a client apparatus 100. The communication device 715 may further have, for example, a function of transmitting a request to the client apparatus 100 and receiving a response to the request from the client apparatus 100.

The audio outputting circuit 716 amplifies analog sound data decoded by the decoder 713 and DA converted by the control device 701 and outputs the amplified analog sound data to the remote controller 718. The analog sound data is outputted from the remote controller 718 to the headphone 719 such that sound is outputted from a speaker not shown built in the headphone 719.

2. Modification

While a preferred embodiment of the disclosed technology has been described in detail above with reference to the accompanying drawings, naturally the disclosed technology is not limited to the embodiment. It is apparent that a person skilled in the art could have made various alterations or modifications without departing from the spirit and scope of the disclosed technology as defined in claims, and it is understood that also such alterations and modifications naturally fall within the technical scope of the disclosed technology.

For example, while, in the embodiment, the transfer device 400 is incorporated in the client apparatus 100, it may otherwise be incorporated in the server apparatus 200 or in the reproduction apparatus 300. For example, in the case were the transfer device 400 is incorporated in the client apparatus 100, the user can carry out editing of the "SyncList" only when it uses a client apparatus 100 owned by itself.

On the other hand, for example, in the case where the transfer device 400 is incorporated in the server apparatus 200, it is possible for a user to access the transfer device 400 through a client apparatus 100 of a different person or through a reproduction apparatus 300 of a different person to carry out editing of the "SyncList." For example, in the case where the transfer device 400 is incorporated in the reproduction apparatus 300, the user can carry out editing of the "SyncList" from the reproduction apparatus 300 only in the case where the reproduction apparatus 300 is connected to a client apparatus 100.

3. Summary

With the present embodiment described above, when a plurality of content data are successively transmitted from the server apparatus 200 to the reproduction apparatus 300 through a client apparatus 100, it is possible to resume, even if the transmission is interrupted, the transmission of a plurality of content data from the point at which the transmission is interrupted. Transmission of content data may possibly be interrupted when connection between the apparatus is cut, when an interruption operation is carried out by the user or in a like case. For example, if the user re-connects the reproduction apparatus 300 to the client apparatus 100, then it can resume transmission of a plurality of content data.

Further, also while the Web application 221 is not started, transmission of a plurality of content data can be resumed. Transmission of a plurality of content data can be resumed also from the different client apparatus 100B different from a client apparatus 100A which has been used before the transmission of a plurality of content data is interrupted. For example, in the middle of transmission of a plurality of content data carried out by the user using a PC at home, it is possible for the user to interrupt the transfer and then carry out continuing transfer using another PC in a coffee lounge.

Further, it is possible to maintain the "SyncList" in the retained state even if the Web browser 1121 is updated. Therefore, surplus labor and time required for editing of the "SyncList" when the "SyncList" otherwise disappears upon updating of the Web browser 1121 can be omitted.

What is claimed is:

1. An apparatus comprising:
   circuitry configured to
   control a reception, from a server, of a plurality of content data corresponding to a plurality of content identifiers in a list,
   control a transmission of the plurality of content data to a reproduction apparatus,
   initiate a deletion of a content identifier from the list when the corresponding content data is transferred to the reproduction apparatus,
   control a reception of a first request to resume the transfer from the reproduction apparatus after the transfer is interrupted,
   control an acquisition of remaining content identifiers in the list of the reproduction apparatus in response to the first request,
   initiate production of a second request for requesting transfer of content data corresponding to the acquired remaining content identifiers that remain in the list after the deletion of the content identifier from the list, and
   control a reception of the content data corresponding to the acquired remaining content identifiers from the server.

2. The apparatus according to claim 1, further comprising:
   a computer-readable storage medium configured to store the list including the plurality of content identifiers.

3. The apparatus according to claim 1, wherein the plurality of content data is successively transmitted to the reproduction apparatus.

4. The apparatus according to claim 3, wherein the circuitry causes the list after the content identifier is deleted to be retained into the reproduction apparatus, and initiates an acquisition, based on the first request, of the remaining content identifiers that remain in the list after the deletion from the list, and then initiates production of a transmission request including the acquired remaining content identifiers.

5. The apparatus according to claim 3, wherein the circuitry causes the list after the content identifier is deleted to be retained into the server, initiates an acquisition, based on the first request, of the remaining content identifiers that remain in the list after the deletion of the content identifier from the list, and then initiates production of a transmission request including the acquired remaining content identifiers.

6. The apparatus according to claim 1, wherein the circuitry is further configure to control the acquisition of remaining content identifiers that remain in the list after the deletion of the content identifier from the list and a production of a content transmission request including the remaining content identifiers, based on the first request.

7. The apparatus according to claim 1, wherein the circuitry is further configured to
   control a reception of a starting request indicating that transfer of the plurality of content data to the reproduction apparatus is to be started,
   control, based on the reception of the starting request, an acquisition of a transmission completion list including content identifiers of one or plural contents individually corresponding to content data retained in the reproduction apparatus, a detection of transmission completed content identifiers included in the transmission completion list but is not included in the list received from the server, and a causing of content data identified based on the detected transmission completed content identifiers to be deleted from the reproduction apparatus, and
   control a transmission of a content transmission request to the server after the content data identified based on the detected transmission completed content identifiers is caused to be deleted from the reproduction apparatus.

8. The apparatus according to claim 1, wherein the circuitry is further configured to
   control an acquisition, when playlist identification information for identifying a playlist in which content identifiers of plural contents individually corresponding to the plurality of content data is arranged in a reproduction order is included in the received list, of the content identifiers of the plural contents which configures the playlist identified based on the playlist identification information.

9. The apparatus according to claim 1, wherein the circuitry controls the reception of the content data corresponding only to the acquired remaining content identifiers.

10. A method, the method being executed via at least one processor having circuitry, and comprising:
    receiving, from a server, a plurality of content data corresponding to a plurality of content identifiers in a list,
    transmitting the plurality of content data to a reproduction apparatus,
    deleting a content identifier from the list when the corresponding content data is transferred to the reproduction apparatus,
    receiving a first request to resume the transfer from the reproduction apparatus after the transfer is interrupted,
    acquiring remaining content identifiers in the list of the reproduction apparatus in response to the first request,
    producing a second request for requesting transfer of content data corresponding to the acquired remaining content identifiers that remain in the list after the deletion of the content identifier from the list, and
    receiving the content data corresponding to the acquired remaining content identifiers from the server.

11. A non-transitory computer-readable medium having embodied thereon a program, which when executed by a computer having circuitry, causes the computer to execute a method, the method comprising:
    receiving, from a server, a plurality of content data corresponding to a plurality of content identifiers in a list,
    transmitting the plurality of content data to a reproduction apparatus,
    deleting a content identifier from the list when the corresponding content data is transferred to the reproduction apparatus,
    receiving a first request to resume the transfer from the reproduction apparatus after the transfer is interrupted,
    acquiring remaining content identifiers in the list of the reproduction apparatus in response to the first request,
    producing a second request for requesting transfer of content data corresponding to the acquired remaining content identifiers that remain in the list after the deletion of the content identifier from the list, and
    receiving the content data corresponding to the acquired remaining content identifiers from the server.

* * * * *